US012587825B2

(12) United States Patent
Tomici et al.

(10) Patent No.: US 12,587,825 B2
(45) Date of Patent: Mar. 24, 2026

(54) INTER-SYSTEM MOBILITY IN INTEGRATED WIRELESS NETWORKS

(71) Applicant: InterDigital Patent Holdings, Inc., Wilmington, DE (US)

(72) Inventors: John L. Tomici, Southold, NY (US); Michael F. Starsinic, Newtown, PA (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/151,983

(22) Filed: Jan. 9, 2023

(65) Prior Publication Data

US 2023/0164653 A1 May 25, 2023

Related U.S. Application Data

(63) Continuation of application No. 16/801,783, filed on Feb. 26, 2020, now abandoned, which is a (Continued)

(51) Int. Cl.
*H04W 76/12* (2018.01)
*H04W 8/06* (2009.01)
(Continued)

(52) U.S. Cl.
CPC ............. *H04W 8/06* (2013.01); *H04W 12/08* (2013.01); *H04W 76/12* (2018.02); (Continued)

(58) Field of Classification Search
CPC ....... H04W 36/14; H04W 8/06; H04W 12/08; H04W 76/12; H04W 88/06; H04W 88/16; H04W 92/24; H04W 12/04; H04W 12/06
See application file for complete search history.

(56) References Cited

U.S. PATENT DOCUMENTS

| | | | |
|---|---|---|---|
| 7,539,175 B2 | 5/2009 | White et al. | |
| 7,650,143 B2 | 1/2010 | Jagadeesan et al. | |

(Continued)

FOREIGN PATENT DOCUMENTS

| | | | |
|---|---|---|---|
| CN | 101022450 A | 8/2007 | |
| CN | 101090573 A | 12/2007 | |

(Continued)

OTHER PUBLICATIONS

U.S. Appl. No. 16/801,783, filed Feb. 26, 2020.
(Continued)

*Primary Examiner* — Lakeram Jangbahadur
(74) *Attorney, Agent, or Firm* — Flaster Greenberg P.C.

(57) ABSTRACT

A system is disclosed for providing inter-system mobility in integrated LTE and WiFi systems. A control plane interface, referred to as the S1a-C interface, is defined between a trusted WLAN access network (TWAN) and a mobility management entity (MME) comprised in an LTE wireless access network. A user plane interface, referred to as the S1a-U interface, is defined between the TWAN and a server gateway (SGW) in the LTE wireless access network. The MME operates as a common control plane entity for both LTE and TWAN access, while the SGW operates as a user plane gateway for both LTE and TWAN. The integrated MME and SGW allow for user equipment (UE) to access the capabilities of a packet data network (PDN) through either the LTE access network or TWAN.

20 Claims, 23 Drawing Sheets

Related U.S. Application Data continuation of application No. 15/321,365, filed as application No. PCT/US2015/037186 on Jun. 23, 2015, now abandoned.

(60) Provisional application No. 62/015,763, filed on Jun. 23, 2014.

(51) Int. Cl.

| | |
|---|---|
| *H04W 12/08* | (2021.01) |
| *H04W 36/14* | (2009.01) |
| *H04W 88/06* | (2009.01) |
| *H04W 88/16* | (2009.01) |
| *H04W 92/24* | (2009.01) |

(52) U.S. Cl.
CPC ........ *H04W 36/1446* (2023.05); *H04W 88/06* (2013.01); *H04W 88/16* (2013.01); *H04W 92/24* (2013.01)

(56) References Cited

U.S. PATENT DOCUMENTS

| | | | |
|---|---|---|---|
| 8,014,367 | B2 | 9/2011 | Carlton et al. |
| 8,174,994 | B2 | 5/2012 | Forssell et al. |
| 8,224,303 | B2 | 7/2012 | White |
| 8,289,954 | B2 | 10/2012 | Tenny et al. |
| 9,042,373 | B2 | 5/2015 | Lu et al. |
| 9,510,256 | B2 | 11/2016 | Krishna et al. |
| 9,622,121 | B2 | 4/2017 | Lu et al. |
| 10,009,802 | B2 | 6/2018 | Lu et al. |
| 2002/0184510 | A1 | 12/2002 | Shieh |
| 2006/0002344 | A1 | 1/2006 | Ono et al. |
| 2006/0256751 | A1 | 11/2006 | Jagadeesan et al. |
| 2006/0259951 | A1 | 11/2006 | Forssell et al. |
| 2007/0041350 | A1 | 2/2007 | Famolari |
| 2007/0064660 | A1 | 3/2007 | Qi et al. |
| 2007/0291685 | A1 | 12/2007 | Fiat |
| 2008/0107119 | A1 | 5/2008 | Chen et al. |
| 2008/0159232 | A1 | 7/2008 | Thalanany et al. |
| 2008/0273524 | A1 | 11/2008 | Tenny et al. |
| 2009/0201881 | A1 | 8/2009 | Chun et al. |
| 2009/0207812 | A1 | 8/2009 | Gupta et al. |
| 2009/0287764 | A1 | 11/2009 | Pazhyannur et al. |
| 2010/0208698 | A1 | 8/2010 | Lu et al. |
| 2010/0323700 | A1 | 12/2010 | Bachmann et al. |
| 2011/0141884 | A1* | 6/2011 | Olsson .................. H04W 24/04 370/225 |
| 2011/0310876 | A1 | 12/2011 | Carlton et al. |
| 2012/0140743 | A1 | 6/2012 | Pelletier et al. |
| 2013/0005332 | A1 | 1/2013 | Sedlacek et al. |
| 2013/0077482 | A1* | 3/2013 | Krishna ................ H04W 36/22 370/230 |
| 2013/0157659 | A1 | 6/2013 | Ikeda et al. |
| 2013/0294409 | A1 | 11/2013 | Shuai et al. |
| 2013/0308513 | A1* | 11/2013 | Jheng ............... H04W 52/0216 370/311 |
| 2014/0036807 | A1* | 2/2014 | Huang ................. H04W 76/11 370/329 |
| 2014/0185603 | A1* | 7/2014 | Kaippallimalil .. H04W 36/0027 370/338 |
| 2015/0103804 | A1* | 4/2015 | Gao .................. H04W 36/1446 370/331 |
| 2015/0282026 | A1 | 10/2015 | Gupta |
| 2016/0112896 | A1 | 4/2016 | Karampatsis et al. |
| 2022/0264573 | A1 | 8/2022 | Marinier et al. |

FOREIGN PATENT DOCUMENTS

| | | | |
|---|---|---|---|
| CN | 101431780 | A | 5/2009 |
| CN | 102752830 | A | 10/2012 |
| CN | 103369502 | A | 10/2013 |
| CN | 103517264 | A | 1/2014 |
| CN | 103687071 | A | 3/2014 |
| CN | 103716770 | A | 4/2014 |
| EP | 1538861 | A2 | 6/2005 |
| JP | 2005-057551 | A | 3/2005 |
| JP | 2008-278512 | A | 11/2008 |
| JP | 2011-509615 | A | 3/2011 |
| JP | 2013-131793 | A | 7/2013 |
| KR | 10-2006-0113727 | A | 11/2006 |
| KR | 10-2008-0009131 | A | 1/2008 |
| KR | 10-2014-0006329 | A | 1/2014 |
| KR | 10-2014-0038703 | A | 3/2014 |
| KR | 10-2017-0019466 | A | 2/2017 |
| TW | 200822617 | A | 5/2008 |
| TW | 200901799 | A | 1/2009 |
| WO | 2004/105272 | A1 | 12/2004 |
| WO | 2006/130058 | A1 | 12/2006 |
| WO | 2007/063901 | A1 | 6/2007 |
| WO | 2007/144225 | A1 | 12/2007 |
| WO | 2013/019501 | A1 | 2/2013 |
| WO | 2014/107358 | A1 | 7/2014 |
| WO | 2016/059109 | A2 | 4/2016 |

OTHER PUBLICATIONS

U.S. Appl. No. 15/321,365, filed Dec. 22, 2018.

3GPP TS 23402 V12.4.0, 3rd Generation Partnership Project; Technical Specification Group Services and System Aspects; Architecture Enhancements for non-3GPP Accesses (Release 12), Mar. 2014.

3GPP, "3rd Generation Partnership Project; Technical Specification Group Services and System Aspects; Architecture enhancements for non-3GPP accesses", TS 23.402 Release 12, V12.1.0, Jun. 2013, 254 pages.

3rd Generation Partnership Project (3GPP); TSG-SA WG2#79 S2-102299, Cisco, ATT, Nokia, NSN, Ericsson, Prefix Delegation: Use Cases and Solution Discussion, 3GPP, May 2010, 11 pages.

3rd Generation Partnership Project (3GPP); TSG-SA WG2#94 S2-124315, Huawei, Hisilicon, Proposal for SaMOG Solution with Simple IPSec Tunnel, 3GPP, Nov. 2012, 14 pages.

3rd Generation Partnership Project (3GPP); TSG-SA WG2-#95 S2-130535, ZTE, China Unicom, Broadcom Corporation, Merged Stateful DHCP-Based Solution, 3GPP, Jan. 2013, 22 pages.

3rd Generation Partnership Project; (3GPP) TR 23.852 V12.0.0, 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.

3rd Generation Partnership Project; (3GPP) TS 22.234 V11.0.0, 3rd Generation Partnership Project; Technical Specification Group Services and System Aspects; Requirements on 3GPP system to Wireless Local Area Network (WLAN) interworking (Release 11) Sep. 2012, 15 pages.

3rd Generation Partnership Project; (3GPP) TS 23.234 V11.0.0, 3rd Generation Partnership Project; Technical Specification Group Services and System Aspects; 3GPP system to Wireless Local Area Network (WLAN) interworking; System description (Release 11) Sep. 2012, 84 pages.

3rd Generation Partnership Project; (3GPP) TS 23.401 V12.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Dec. 2013, 302 pages.

3rd Generation Partnership Project; (3GPP) TS 23.402 V12.3.0, 3rd Generation Partnership Project; Technical Specification Group Services and System Aspects; Architecture Enhancements for Non-3GPP Accesses (Release 12), Dec. 2013, 288 pages.

3rd Generation Partnership Project; (3GPP) TS 24.008 V12.4.0, 3rd Generation Partnership Project; Technical Specification Group Core Network and Terminals; Mobile radio interface Layer 3 specification; Core network protocols; Stage 3 (Release 12), Dec. 2013, 685 pages.

3rd Generation Partnership Project; (3GPP) TS 24.244 V1.0.0, 3rd Generation Partnership Project; Technical Specification Group Core

(56) References Cited

OTHER PUBLICATIONS

Network and Terminals; Wireless LAN control plane protocol for trusted WLAN access to EPC; Stage 3 (Release 12), Feb. 2014, 25 pages.

3rd Generation Partnership Project; (3GPP) TS 29.273 V12.2.0, 3rd Generation Partnership Project; Technical Specification Group Core Network and Terminals; Evolved Packet System (EPS); 3GPP EPS AAA interfaces (Release 12), Dec. 2013, 137 pages.

3rd Generation Partnership Project; (3GPP) TS 29.274 V12.3.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Dec. 2013, 236 pages.

3rd Generation Partnership Project; (3GPP) TS 29.281 V11.6.0, 3rd Generation Partnership Project; Technical Specification Group Core Network and Terminals; General Packet Radio System (GPRS) Tunnelling Protocol User Plane (GTPv1-U) (Release 11) Mar. 2013, 27 pages.

3rd Generation Partnership Project; (3GPP) TS 43.318 V11.0.0, 3rd Generation Partnership Project; Technical Specification Group GSM/EDGE Radio Access Network; Generic Access Network (GAN); Stage 2 (Release 11), Sep. 2012, 128 pages.

Ericsson: Initial attach and handover attach call flows for single-connection, sA WG2 Meeting #100 S2-134261, 2013, 3-15.

Ferrus et al, "Interworking in Heterogeneous Wireless Networks: Comprehensive Framework and Future Trends", IEEE Wireless Communications, Apr. 2010, 22-31.

International Patent Application No. PCT/US2015/037186: International Search Report and The Written Opinion dated Oct. 2, 2015, 12 pages.

Korean Patent Application No. 10-2017-7001904: Preliminary Rejection dated Jul. 17, 2017, 10 pages.

Ramon Ferrus et al: "Interworking in heterogeneous wireless networks: Comprehensive framework and future trends", IEEE Wireless Communications, IEEE Service Center, Piscataway, NJ, US, vo I. 17, No. 2, Apr. 1, 2010, pp. 22-31.

Sankaran, C.B., "Data Offloading Techniqures in 3GPP Rel-10 Networks: A Tutorial", IEEE Communications Magazine, Jun. 2012, 46-53.

SANKARAN: "Data offloading techniques in 3GPP Rel-10 networks: A tutorial", IEEE Communications Magazine, IEEE Service Center, Piscataway, US, vol. 50, No. 6, Jun. 1, 2012, pp. 46-53.

Tomici et al, "Integrated Small Cell and Wi-Fi Networks" 2015 IEEE Wireless Communications and Networking Conference (WCNC):—Track 3: Mobile and Wireless Networks, 2015 1261-1266.

Takechi et al., "Network Selection and Route Management for the Mobile Networks", The Transactions of the Institute of Electronics, Information and Communication Engineers B, vol. J89-B, No. 2, Feb. 1, 2006, 12 pages (11 pages of original document and 1 page of English Translation).

3rd Generation Partnership Project (3GPP), S2-082105, "ANDSF-Initiated Transactions", Motorola, InterDigital, AT&T, Intel, 3GPP TSG-SA WG2 Meeting #64, Jeju, South Korea, Apr. 7-11, 2008, 5 pages.

3rd Generation Partnership Project (3GPP), TD S1-084182, "Use Cases for MAPIM", 3GPP TSG-SA WG1, Meeting #43, Miami, Flordia, Nov. 17-21, 2008, 4 pages.

3rd Generation Partnership Project (3GPP), TD S2-086386, "Multi Access PDN Connectivity and IP Flow Mobility-WID", China Mobile, Marvell, Orange, Panasonic, Qualcomm Europe, Samsung, Telecom Italia, TeliaSonera, 3GPP TSG SA WG2 Meeting #67, Sophia Antipolis, France, Aug. 25-29, 2008, 4 pages.

3rd Generation Partnership Project (3GPP), TR 23.861 V1.2.0, "Technical Specification Group Services and System Aspects, Multi Access PDN Connectivity and IP Flow Mobility (Release 9)", May 2009, pp. 1-48.

3rd Generation Partnership Project (3GPP), TR 23.xxx V0.1.0, "Technical Specification Group Services and System Aspects, Multi Access PDN Connectivity and IP Flow Mobility (Release 9)", Nov. 2008, pp. 1-14.

3rd Generation Partnership Project (3GPP), TS 23.060 V8.3.0, "Technical Specification Group Services and System Aspects, General Packet Radio Service (GPRS), Service Description, Stage 2 (Release 8)", Dec. 2008, pp. 1-271.

3rd Generation Partnership Project (3GPP), TS 23.060 V8.7.0, "Technical Specification Group Services and System Aspects, General Packet Radio Service (GPRS), Service Description, Stage 2 (Release 8)", Dec. 2009, pp. 1-280.

3rd Generation Partnership Project (3GPP), TS 23.060 V9.3.0, "Technical Specification Group Services and System Aspects, General Packet Radio Service (GPRS), Service Description, Stage 2 (Release 9)", Dec. 2009, pp. 1-295.

3rd Generation Partnership Project (3GPP), TS 23.203 V8.4.0, "Technical Specification Group Services and System Aspects, Policy and Charging Control Architecture (Release 8)", Dec. 2008, pp. 1-111.

3rd Generation Partnership Project (3GPP), TS 23.203 V8.8.0, "Technical Specification Group Services and System Aspects, Policy and Charging Control Architecture (Release 8)", Dec. 2009, pp. 1-115.

3rd Generation Partnership Project (3GPP), TS 23.203 V9.3.0, "Technical Specification Group Services and System Aspects, Policy and Charging Control Architecture (Release 9)", Dec. 2009, pp. 1-123.

3rd Generation Partnership Project (3GPP), TS 23.327 V8.2.0, "Technical Specification Group Services and System Aspects, Mobility between 3GPP-Wireless Local Area Network (WLAN) Interworking and 3GPP Systems (Release 8)", Dec. 2008, pp. 1-27.

3rd Generation Partnership Project (3GPP), TS 23.327 V9.0.0, "Technical Specification Group Services and System Aspects, Mobility between 3GPP-Wireless Local Area Network (WLAN) interworking and 3GPP Systems (Release 9)", Dec. 2009, pp. 1-27.

3rd Generation Partnership Project (3GPP), TS 23.401 V8.4.1, "Technical Specification Group Services and System Aspects, General Packet Radio Service (GPRS) Enhancements for Evolved Universal Terrestrial Radio Access Network (E-UTRAN) Access (Release 8)". Dec. 2008. pp. 1-219.

3rd Generation Partnership Project (3GPP), TS 23.401 V8.8.0, "Technical Specification Group Services and System Aspects, General Packet Radio Service (GPRS) Enhancements for Evolved Universal Terrestrial Radio Access Network (E-UTRAN) Access (Release 8)", Dec. 2009, pp. 1-239.

3rd Generation Partnership Project (3GPP), TS 23.401 V9.3.0, "Technical Specification Group Services and System Aspects, General Packet Radio Service (GPRS) Enhancements for Evolved Universal Terrestrial Radio Access Network (E-UTRAN) Access (Release 9)", Dec. 2009, pp. 1-254.

3rd Generation Partnership Project (3GPP), TS 23.402 V8.4.0, "Technical Specification Group Services and System Aspects, Architecture Enhancements for Non-3GPP Accesses (Release 8)", Dec. 2008, pp. 1-190.

3rd Generation Partnership Project (3GPP), TS 23.402 V8.8.0, "Technical Specification Group Services and System Aspects, Architecture Enhancements for Non-3GPP Accesses (Release 8)", Dec. 2009, pp. 1-199.

3rd Generation Partnership Project (3GPP), TS 23.402 V9.3.0, "Technical Specification Group Services and System Aspects, Architecture Enhancements for Non-3GPP Accesses (Release 9)", Dec. 2009, pp. 1-198.

3rd Generation Partnership Project (3GPP), TS 24.302 V8.0.0, Technical Specification Group Core Network and Terminals, Access to the 3GPP Evolved Packet Core (EPC) Via Non-3GPP Access Networks, Stage 3, (Release 8), Dec. 2008, pp. 1-40.

3rd Generation Partnership Project (3GPP), TS 24.302 V8.4.1, "Technical Specification Group Core Network and Terminals, Access to the 3GPP Evolved Packet Core (EPC) Via Non-3GPP Access Networks, Stage 3 (Release 8)", Dec. 2009, pp. 1-50.

3rd Generation Partnership Project (3GPP), TS 24.302 V9.1.1, "Technical Specification Group Core Network and Terminals, Access

(56)        References Cited

OTHER PUBLICATIONS to the 3GPP Evolved Packet Core (EPC) Via Non-3GPP Access Networks, Stage 3, (Release 9)", Dec. 2009, pp. 1-52.

3rd Generation Partnership Project, TR 23.861 V1.0.0, "Technical Specification Group Services and System Aspects, Multi Access PDN Connectivity and IP Flow Mobility (Release 9)", Mar. 2009, 34 pages.

Melia et al., "IEEE 802.21 Mobility Services Framework Design (MSFD)", Network Working Group, Request for Comments: 5677, Category: Standards Track, Dec. 2009, pp. 1-25.

Soliman et al., "Flow Bindings in Mobile IPv6 and NEMO Basic Support", IETF MEXT Working Group, Internet-Draft, Intended Status: Standards Track, Intended Status: Standards Track, Feb. 13, 2009, pp. 1-32.

Soliman et al., "Flow movement in Mobile IPv6", , Jun. 2003, pp. 1-8.

3rd Generation Partnership Project (3GPP), TR 23.xxx V0.1.0, "Technical Specification Group Services and System Aspects, Multi Access PDN Connectivity and IP Flow Mobility (Release 9)", Nov. 2008, pp. 1-14. (this reference is being resubmitted because an incorrect copy of the reference was submitted in a prior IDS filing).

* cited by examiner

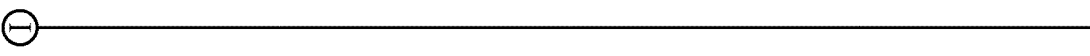

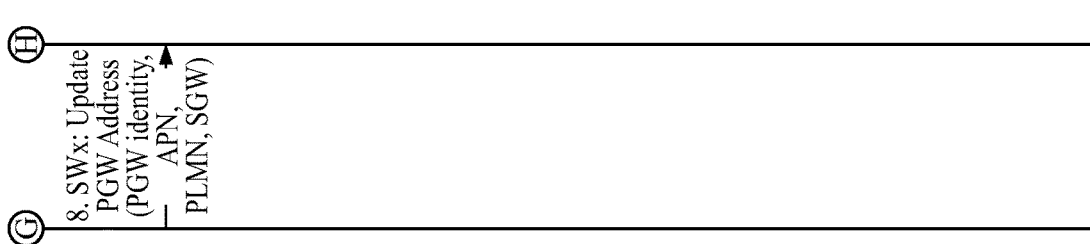

Ⓘ

Ⓗ

8. SWx: Update
PGW Address
(PGW identity,
APN,
PLMN, SGW)

Ⓖ

Ⓕ

9. "S5": Create
Session
Response (tunnel
info, bearer
parameters,
UE IP address)

Ⓔ

10. "S11 prime":
Create
Session Response

Ⓓ

11. "S1a-C": Create Session Response
(tunnel info, bearer parameters, UE IP address)

11. S1a-U: GTP Tunnel

Ⓒ

13. WLAN user data

13 ISW-enabled SGW+
TWAG routes packets
between UE and
PGW via WLAN AN

User Data

Ⓑ

12. WLCP:
PDN
Connection
Response

13. WLAN user data

User Data

Figure 7B:
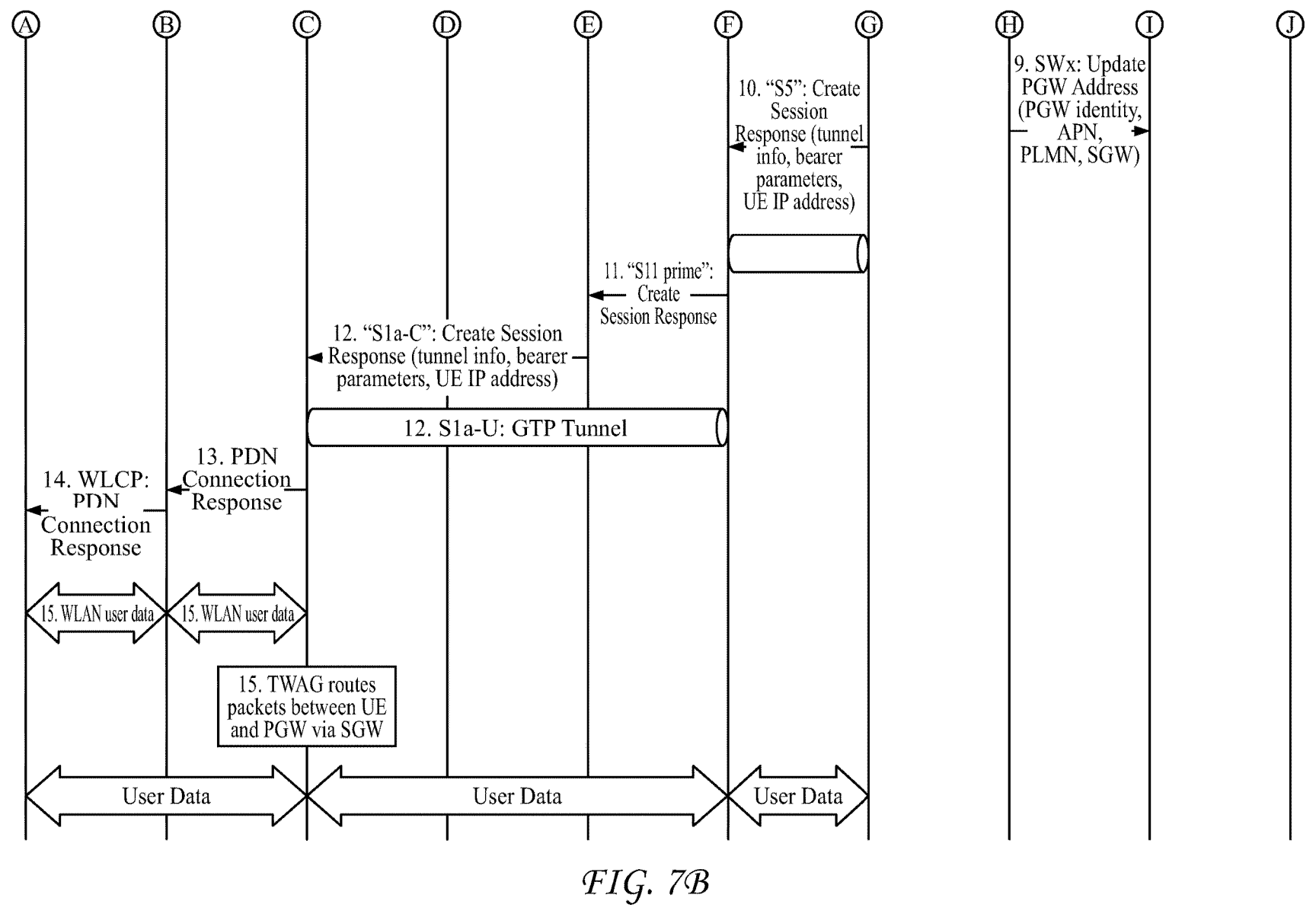

9. SWx: Update PGW Address (PGW identity, APN, PLMN, SGW)

Ⓗ

Ⓖ

10. "S5": Create Session Response (tunnel info, bearer parameters, UE IP address)

Ⓕ

11. "S11 prime": Create Session Response

Ⓔ

12. "S1a-C": Create Session Response (tunnel info, bearer parameters, UE IP address)

12. S1a-U: GTP Tunnel

Ⓓ

Ⓒ

13. PDN Connection Response

15. WLAN user data

15. TWAG routes packets between UE and PGW via SGW

User Data

Ⓑ

14. WLCP: PDN Connection Response

15. WLAN user data

User Data

INTER-SYSTEM MOBILITY IN INTEGRATED WIRELESS NETWORKS

CROSS REFERENCE TO RELATED APPLICATIONS

This application is a continuation of U.S. patent application Ser. No. 16/801,783 filed Feb. 26, 2020 which is a continuation of U.S. patent application Ser. No. 15/321,365 filed Dec. 22, 2016 which is a National Stage Application filed under 35 U.S.C. 371 of International Application No. PCT/US2015/037186, filed Jun. 23, 2015, which claims benefit under 37 U.S.C. § 119(e) of Provisional U.S. Patent Application No. 62/015,763, filed on Jun. 23, 2014, the contents of which are hereby incorporated herein by reference in its entirety.

BACKGROUND

As wireless communications technologies have evolved, additional demands have been placed on wireless systems to support more extensive use of diverse wireless networks. For example, mobile network operators (MNOs) have begun incorporating "carrier-grade" WiFi in ways that complement their cellular and core network services. For instance, MNOs have sought to employ WiFi to offload Internet traffic from their cellular and core networks. MNOs have also sought to provide users of WiFi networks with access to the evolved packet core (EPC) of cellular systems.

While demand continues to increase for inter-system integration of cellular and WiFi networks, existing methods of providing such integration have proven to be resource intensive and too often result in interruptions in ongoing communications.

SUMMARY

Applicants disclose herein systems and methods for inter-system mobility in integrated long term evolution (LTE) and trusted wireless local area network (WLAN) access networks (TWAN). A control plane interface, referred to as the S1a-C interface, is defined between a trusted WLAN access network (TWAN) and a mobility management entity (MME) comprised in a 3GPP core network. A user plane interface, referred to as the S1a-U interface, is defined between the TWAN and a serving gateway (SGW) in the 3GPP core network. The MME operates as a common control plane entity for both LTE and TWAN access, while the SGW operates as a user plane serving gateway for both LTE and TWAN access network. The integrated MME and SGW allow for user equipment (UE) to access the capabilities of a 3GPP packet data network (PDN) through either the LTE or TWAN access network. Moreover, an existing communication connection between a UE and a 3GPP PDN may be handed over from one of the LTE or TWAN access network to the other. Still further, the MME and SGW provide for simultaneously maintaining two accessing communication paths, one via the LTE and one via the TWAN, between a UE and a 3GPP packet core network.

In an example scenario, user equipment (UE) such as, for example, a wireless phone or other computing system, may attempt to attach to the evolved packet core (EPC) of a 3GPP network via a TWAN access network. The processing may be initiated, for example, when a UE associates with a WiFi access point. In response to this association with the WiFi access point, the TWAN generates and transmits an authentication request to a 3GPP AAA server. A trusted WLAN AAA proxy (TWAP) comprised in the TWAN generates and transmits the authentication request. In response to the authentication request, the TWAN, and in particular, the TWAP, receives an answer from the 3GPP AAA server indicating communication between the TWAN and a mobility management entity (MME) via a first interface is authorized. In an example scenario, the received answer identifies that communication over the S1a-C interface is authorized.

The TWAN generates and transmits a request to create a session to the MME over the S1a-C interface. In an example embodiment, a WLAN access node (AN) comprised in the TWAN generates and transmits the request. In response to receiving the request, the MME generates and transmits a create session request to the SGW. In an example embodiment, the MME communicates the create session request to the SGW over an S11 interface that is adapted to accommodate the request.

The SGW generates and transmits a request to create a session to a selected packet data network (PDN) gateway (PGW). Upon receipt of the request, the PGW coordinates the requested attachment of the UE within the 3GPP network and, assuming the request is authorized, generates and transmits a create session response.

The SGW receives the create session response, which, in an example embodiment, includes an IP address for the UE. The SGW forwards the response to the MME, which transmits the create session response including the IP address for the UE to the TWAN over the S1a-C interface. The response may be received at the WLAN AN within the TWAN and communicated to the TWAP along with an indication that a second interface, the S1a-U interface, has been successfully established. The TWAN, and in particular, the TWAP, communicates to the UE that the attach procedure is completed. The UE receives the IP address from the WLAN. Thereafter, the TWAN routes packets between the UE and the PGW via the SGW and the S1a-U interface.

According to another aspect of the disclosed systems and methods, the communication path used by a UE to a PDN may be handed over from one of the wireless networks to the other. For example, in a situation where a UE has an established communication path to a PDN network via a WiFi connection through a TWAN, the connection to the PDN may be handed over for routing through the LTE access network. Analogously, where a UE has an established connection to a PDN via the LTE access network, the connection may be handed over for routing through the TWAN instead of the LTE access network. In an example scenario, a UE discovers a WiFi access point (AP) associated with a TWAN that has been integrated with an LTE access network with which the UE has an existing connection. The UE associates with the WiFi access point using the attach procedure as described above. The association results in the establishment of an S1a-C interface between the TWAN and an MME in the 3GPP network, as well as the identification of an S1a-U interface between the TWAN and an SGW in the 3GPP network.

With a connection established to the PDN via the TWAN, the UE generates, and the TWAN receives, a connection request that indicates a request to hand over control from the existing LTE connection. In an example embodiment, the handover request is received at the WLAN AN which forwards the request to the trusted WLAN access gateway (TWAG). In an example embodiment, the TWAG forwards the request over the established S1a-C interface to the MME. The MME generates and transmits a request to the SGW over an S11 interface.

The SGW generates and transmits a request for a handover to the PGW. Upon receipt of the request, the PGW coordinates the handover of the existing connection of the UE within the 3GPP network and, assuming the request is authorized, generates and transmits a create session response. The response includes information regarding the existing communication path between the SGW and the PDN that was previously established to service access through the LTE access network.

The SGW receives the response including the information regarding the existing communication path and forwards the response to the MME. The MME transmits the responsive information to the TWAN over the S1a-C interface. The response may be received at TWAG which forwards the information to the WLAN AN. The WLAN communicates that the connection to the PDN via the TWAN has been established. In other words, the TWAN communicates information to the PDN that was previously routed through the LTE network. The UE may then initiate to release the LTE connection.

According to another aspect of the disclosed systems and methods, two communication paths—one via the LTE access network and one via the TWAN between a UE and a 3GPP PDN—may be established and maintained. For example, in a situation where a UE has an established communication path to a 3GPP PDN network via a WiFi connection through a TWAN, a communication path may be added and maintained through the LTE access network. Analogously, where a UE has an established communication path to a 3GPP PDN network via the LTE access network, a communication path through the TWAN may be added and maintained. In an example scenario, a UE that has an established connection to a 3GPP PDN via LTE discovers a WiFi access point (AP) associated with a TWAN that has been integrated with the LTE access network. The UE associates with the WiFi access point using the attach procedure as described above. The association results in the establishment of an S1a-C interface between the TWAN and an MME in the 3GPP network, and an S1a-U interface between the TWAN and an SGW in the 3GPP network.

With a connection established to the PDN via the TWAN, the UE generates, and the TWAN receives, a multi-connection request that indicates a request to assign the same IP address for the UE access to the PDN through the TWAN as has been assigned for communication via the LTE access network. In an example embodiment, the multi-connection request is received at the WLAN AN, which forwards the request to the TWAG. In an example embodiment, the TWAG forwards the request over the established S1a-C interface to the MME. The MME generates and transmits a request for a multi-connection session to the SGW over an S11 interface.

The SGW generates and transmits a request for a multi-connection session to the PGW. Upon receipt of the request, the PGW coordinates multi-connectivity of the UE within the 3GPP network and, assuming the request is authorized, generates and transmits a response. The response includes information regarding the existing communication path between the SGW and the PDN that was previously established to service access through the LTE access network including the IP address for the UE.

The SGW receives the response including the information regarding the existing communication path and forwards the response to the MME. The MME transmits the responsive information to the TWAN over the S1a-C interface. The response may be received at the TWAG which forwards the information to the WLAN AN. The WLAN communicates to the UE that the connection to the PDN via the TWAN has been established. Thereafter, the TWAG can route packets between the UE and the PGW via the SGW. The UE may route packets via the SGW over either the TWAN or the LTE access network. The SGW may route packets to the UE over either the TWAN or the LTE access network.

As described in greater detail below, there may be many variations of the above embodiments. For example in some instances, the TWAN that is integrated with the LTE access network may be adapted to provide single-PDN connectivity. While in other instances, the TWAN may be adapted to provide multi-PDN connectivity. By way of further example, the functionality that is traditionally associated with a TWAG portion of a TWAN may be integrated into the SGW in the 3GPP processing network.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

FIGS. 6A-B provide a diagram depicting, for a multi-PDN connection, example processing associated with a UE attaching via a TWAN to a PDN where the TWAG is integrated with the SGW.

FIGS. 7A-B provide a diagram depicting, for a multi-PDN connection, example processing associated with a UE attaching via a TWAN to a PDN where the TWAG is separated from SGW.

DETAILED DESCRIPTION OF ILLUSTRATIVE EMBODIMENTS

Figure 1:
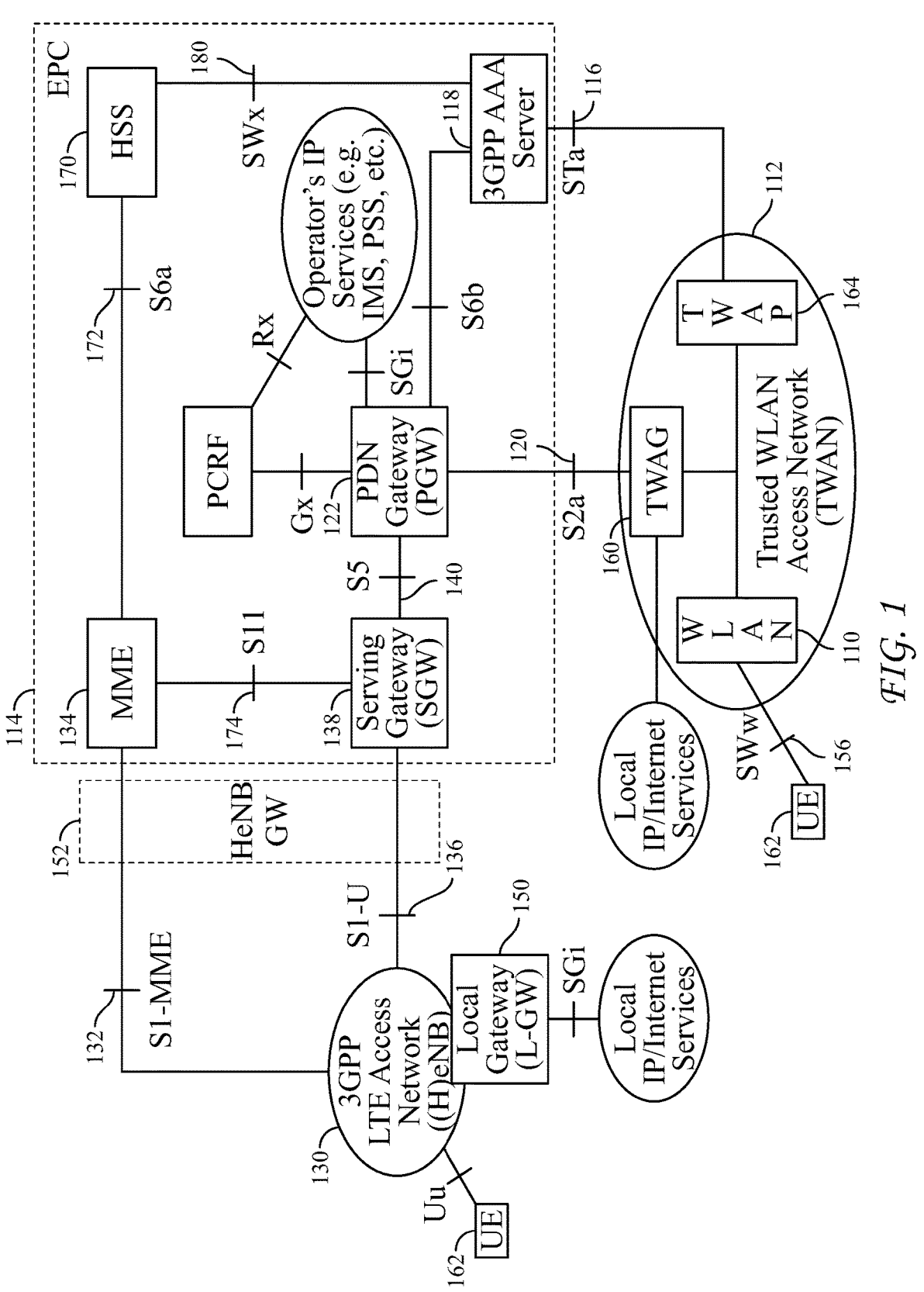
FIG. 1 depicts existing architecture for providing TWAN and 3GPP LTE access to a PDN.

Applicants disclose herein systems and methods for inter-system mobility in integrated LTE and trusted WLAN access networks (TWAN). An S1a-C control plane interface is defined between a trusted WLAN access network (TWAN) and a mobility management entity (MME) comprised in a 3GPP core network. An S1-U user plane interface is defined between the TWAN and a server gateway (SGW) in the 3GPP core network. The MME operates as a common control plane entity for both LTE and TWAN access, while the SGW operates as a user plane serving gateway for both LTE and TWAN. The integrated MME and SGW allow for user equipment (UE) to access the capabilities of a packet data network (PDN) through either the LTE access network or TWAN. Moreover, an existing communication connection between a UE and a PDN may be handed over from one of the LTE access network or TWAN to the other. Still further, the MME and SGW provide for simultaneously maintaining two communication paths, one via the LTE access network and one via the TWAN, between a UE and a packet network.

Example Mobile Network Operations

Under current practices, mobile network operators (MNOs) typically employ WiFi for offloading "best effort" Internet traffic from their cellular and core networks. However, increased interest in operator deployment of "small cells," i.e., localized geographic areas providing wireless network access via 3GPP, and "carrier WiFi" is expected to encourage MNOs to seek better inter-operability across local cellular and WiFi networks.

As operators adopt "carrier WiFi" to optimize their networks and reduce expenses, it is expected that there will be a greater deployment of "Trusted" WLAN Access Networks (TWAN) that can interface directly with an operator's Mobile Core Network (MCN). Similarly, it is expected that there will be greater integration of MNO deployed small cell and WiFi access networks within common geographical areas such as high-traffic urban metropolitan hotspot locations. Such integration is motivated by the growing number of smartphones that support both cellular and WiFi access.

In this context, the term "trusted WLAN (TWAN) access" refers to the circumstances wherein appropriate measures have been taken to safeguard the EPC from access via the WLAN. Such measures are left to the discretion of the MNO and may, for example, include establishment of a tamper-proof fiber connection between the WLAN and EPC, or establishment of an IPSec security association between the WLAN and a Security Gateway at the EPC edge. In contrast, if the WLAN access is deemed "untrusted," the WLAN may interface with an evolved Packet Data Gateway (ePDG) at the EPC edge, and the ePDG must establish an IPSec security association directly with each UE accessing the EPC through the WLAN.

3GPP Activities Related to WLAN Access

The GPRS Tunneling Protocol (GTP) has been the standard transport protocol for packet data in 3GPP networks. In terms of inter-working with a wide assortment of non-3GPP networks, use of the IETF Proxy Mobile IP (PMIP) protocol has been standardized as a general solution for a variety of IP-based access networks such as WiMAX. With respect to WLAN access networks, in particular, there has been activity directed at standardizing procedures for 3GPP access using the GTP protocol. The activities were intended to enable subscriber access to the MNO's core network via lower cost unlicensed 802.11 spectrum in lieu of expensive cellular spectrum. Although operator adoption of generic access network (GAN), I-WLAN, and Untrusted WLAN has been very limited, interest in Trusted WLAN seems to be gaining momentum, especially with respect to the GTP-based option.

The 3GPP Release 11 SA2 work item for "S2a Mobility based on GTP & WLAN access to EPC" (SaMOG) focused on enabling a GTP-based S2a interface to the PDN Gateway (PGW) for "Trusted WLAN Access Networks" (TWANs). This item precluded any solutions that would impact the UE. The Release 11 architectures, functional descriptions, and procedures for GTP-based S2a over trusted WLAN access were subsequently standardized. The applicable GTP control plane protocol for tunnel management (GTPv2-C) and the GTP user plane have also been standardized. SaMOG may be extended to address the Release 11 limitations and may include solutions requiring UE enhancements for UE-initiated PDN connectivity, multi-PDN connectivity, and seamless inter-system handover.

3GPP Release 10 standardized a GTP-based S2b interface for Untrusted WLAN access to the EPC. This included the associated support for a GTP-based S2b interface between an evolved Packet Data Gateway (ePDG) and the PGW. Untrusted WLAN solutions may require UE support for IPSec as well as EPC support of an ePDG for establishing an IPSec tunnel with the UE.

3GPP Release 6 provided a standardized WLAN Inter-working (I-WLAN) solution by introducing a Packet Data Gateway (PDG) for WLAN access to the "pre-EPC" packet-switched core network. This release additionally described how to reuse existing GGSN deployments to implement the PDG functionality using a subset of the Gn interface (denoted as Gn') via a "Tunnel Termination Gateway" (TTG) using GTP towards the GGSN. Again, these solutions may require UE support for IPSec as well as PDG/TTG support for establishing an IPSec tunnel with the UE.

3GPP Release 6 also standardized Generic Access Network (GAN) support for 2G/WiFi dual-mode handsets. Release 8 added support for 3G/WiFi handsets. Unlicensed Mobile Access (UMA) is the commercial name used by mobile carriers for GAN access via WiFi. GAN-enabled UEs can use WiFi to interface with a "GAN Controller" (GANC) that presents itself as a 2G BSC or 3G RNC to the core network. GANC provides a circuit-switched (CS) interface to the MSC, a packet-switched (PS) interface to the SGSN, and a Diameter EAP interface to the AAA Server/Proxy. It also includes a Security Gateway (SeGW) that terminates IPSec tunnels from the UE. Table 2 below illustrates the basic requirements for each GTP-based WLAN solution.

| | GAN/UMA (PS only shown) | I-WLAN | Untrusted WLAN | Trusted WLAN |
|---|---|---|---|---|
| Network Element | GANC | PDG/TTG | ePDG | TWAN |
| CN Interface | SGSN (or GGSN for Direct Tunnel support) | SGSN or GGSN | PGW | PGW |
| CN Protocols | GTP | GTP | GTP or PMIP | GTP or PMIP |
| UE Protocols | IKEv2/IPSec, EAP-AKA, Generic Access Radio Resource Control (GA-RRC), NAS protocols tunneled between UE and SGSN | IKEv2/IPSec, EAP-AKA | IKEv2/IPSec, EAP-AKA | EAP-AKA', WLAN Control Protocol (WLCP) as defined for SaMOG Phase 2. |

Each of the above activities were intended to enable subscriber access to an operator's mobile core network via lower cost unlicensed 802.11 access points in lieu of expensive cellular base stations. Although operator adoption of GAN, I-WLAN, and Untrusted WLAN has been very limited, interest in Trusted WLAN is growing.

Existing Architecture for Cellular LTE and TWAN Access to EPC

FIG. 1 depicts an existing 3GPP architecture that provides cellular LTE and Trusted WLAN access to an EPC 114. As described in section 16.1.1 of 3GPP Technical Specification (TS) 23.402, the contents of which are hereby incorporated herein by reference, when a WLAN 110 is considered trusted by the operator, the Trusted WLAN Access Network (TWAN) 112 can be connected to the Evolved Packet Core (EPC) 114 via the STa interface 116 toward the 3GPP AAA Server 118 for authentication, authorization, and accounting via the S2a interface 120 toward the PDN Gateway (PGW) 122 for user plane traffic flows.

The 3GPP LTE access network 130 (i.e., evolved Node B) is connected to the EPC 114 via the S1-MME interface 132 which provides a communication path with the Mobility Management Entity (MME) 134. The S1-U interface 136 provides a communication path with the Serving Gateway (SGW) 138, which interfaces with the PDN Gateway (PGW) 122 via the S5 interface 140.

An optional "local gateway" function (L-GW) 150 provides small cell LTE access, e.g., for Home eNB (HeNB) deployments. Similarly, an optional "HeNB Gateway" (HeNB GW) 152 may be used to concentrate control plane signaling for multiple HeNBs toward the MME 134 and could also be used to handle HeNB user plane traffic toward the SGW 138.

Trusted WLAN Access Network (TWAN)

WLAN Access Network (WLAN AN) 110 comprises one or more WLAN Access Points (APs). An AP terminates the UE's WLAN IEEE 802.11 link via the SWw interface 156. The APs may be deployed as standalone APs or as "thin" APs connected to a Wireless LAN Controller (WLC) using, for example, the IETF CAPWAP protocols.

Trusted WLAN Access Gateway (TWAG) 160 terminates the GTP-based S2a interface 120 with the PGW 122 and may act as the default IP router for the UE 162 on its WLAN access link. It also may act as a DHCP server for the UE 162. The TWAG 160 typically maintains a UE MAC address association for forwarding packets between the UE 162 (via the WLAN AP) and the associated S2a 120 GTP-U tunnel (via the PGW).

Trusted WLAN AAA Proxy (TWAP) 164 terminates the Diameter-based STa interface 116 with the 3GPP AAA Server 118. The TWAP 164 relays the AAA information between the WLAN AN 110 and the 3GPP AAA Server 118 (or Proxy in case of roaming). The TWAP 164 can inform the TWAG 160 of the occurrence of layer 2 attach and detach events. The TWAP 164 establishes the binding of UE subscription data (including IMSI) with UE MAC address and can provide such information to the TWAG 160.

Authentication and Security over TWAN in Existing Systems

In existing systems, the UE 162 can leverage Universal Subscriber Identity Module (USIM) features for both 3GPP and non-3GPP WLAN access. Processing for authentication and security is described in section 4.9.1 of 3GPP TS 23.402, the contents of which are hereby incorporated by reference in its entirety. As described therein, non-3GPP access authentication, such as that which takes place via a WLAN, defines the process that is used for access control and thereby permits or denies a subscriber from attaching to and using the resources of a non-3GPP IP access which is interworked with the EPC network. Non-3GPP access authentication signaling is executed between the UE and the 3GPP AAA server 118 and HSS 170. The authentication signaling may pass through AAA proxies.

Trusted 3GPP-based access authentication is executed across an STa reference point 116. The 3GPP based access authentication signaling is based on IETF protocols, e.g., Extensible Authentication Protocol (EAP). The STa interface 116 and Diameter application are used for authenticating and authorizing the UE 162 for EPC access via trusted non-3GPP accesses. 3GPP TS 29.273, the contents of which are hereby incorporated by reference in its entirety, describes the standard TWAN procedures currently supported on the STa interface.

IP Address Allocation Over TWAN in Existing Systems

For EPC access via GTP-based TWAN, the IPv4 address and/or IPv6 prefix is allocated to the UE 162 when a new PDN connection is established with the EPC 114 over the TWAN 112. A separate IP address may also be allocated by the TWAN 112 for local network traffic and/or direct Internet offload.

For PDN connectivity through EPC 114 via the TWAN 112, the TWAN 112 receives relevant PDN information via EAP/Diameter or WLCP signaling. The TWAN 112 may request an IPv4 address for the UE 162 from the PGW 122 via the GTP Create Session Request. The IPv4 address is delivered to the TWAN 112 during the GTP tunnel establishment via the GTP Create Session Response. When the UE 162 requests an IPv4 address for PDN connectivity via DHCPv4, the TWAN 112 delivers the received IPv4 address to the UE 162 within DHCPv4 signaling. Corresponding procedures are also defined for IPv6.

Existing Procedures for Access Via LTE

For 3GPP LTE access, the UE 162 automatically triggers a PDN connection as part of its initial attachment to the EPC network 114. The UE 162 may subsequently establish additional PDN connections as needed.

When a UE 162 attempts to attach to the EPC 114 via an (H)eNB LTE access network 130, it first establishes an RRC connection with the (H)eNB LTE access network 130 and encapsulates the Attach Request within the RRC signaling. The (H)eNB LTE access network 130 then forwards the attach request to the MME 134 via S1-AP signaling on the S1-MME interface 132. The MME 134 retrieves subscription information from the HSS 170 via the S6a interface 172 in order to authenticate the UE 162 and allow attachment to the EPC 114.

After successfully authenticating the UE 162, the MME 134 selects an SGW 138 (e.g., based on proximity to the (H)eNB LTE access network 130), and also selects a PGW 122 (e.g., based on the default APN retrieved from HSS 170 or a specific APN requested by UE 162). The MME 134 communicates with the SGW 138 over the S11 interface 174 and requests creation of the PDN connection. The SGW 138 executes the signaling to establish a GTP user plane tunnel with the designated PGW 122 over the S5 interface 140.

"GTP control" signaling takes place within the S1-AP protocol between the MME 134 and (H)eNB 130. This ultimately leads to the establishment of a GTP user plane tunnel on the S1-U interface 136 between (H)eNB 130 and SGW 138. The path for the PDN connection between the UE 162 and PGW 122 is thus completed through the (H)eNB 130 and SGW 138.

Existing Procedures for EPC Access Via TWAN

In existing systems where communications take place via the TWAN 112, UE 162 authentication and EPC 114 attachment is accomplished via EAP signaling between the UE 162 and 3GPP AAA Server 118. The PDN connectivity service is provided by the point-to-point connectivity between the UE 162 and the TWAN 112, concatenated with S2a bearer(s) 120 between the TWAN 112 and the PGW 122.

When a UE 162 attempts to attach to the EPC 114 via a TWAN 112, it first establishes a Layer 2 connection with the WLAN 110 and encapsulates EAP messages within EAPoL signaling. The WLAN 110 forwards the EAP messages to a TWAP 164 which encapsulates the messages within Diameter signaling and forwards the messages to the 3GPP AAA Server 118 via the STa interface 116. The 3GPP AAA Server 118 retrieves subscription information from the HSS 170 via the SWx interface 180 in order to authenticate the UE 162 and allow attachment to the EPC 114.

For 3GPP Release 11, the 3GPP AAA Server 118 also provides the TWAN 112 with information via STa interface 116 for establishing a PDN connection to the default PDN provisioned in the HSS 170. The TWAN 112 then exercises GTP control plane (GTP-C) and user plane (GTP-U) protocols over the S2a interface 120 directly toward the PGW 122, thereby completing the PDN connection between the UE 162 and PGW 122 through the TWAN 112.

For 3GPP Release 12, the SaMOG phase-2 work item defines additional procedures for UE-initiated PDN connectivity, multi-PDN connectivity, and seamless inter-system handover. For the case of single-PDN capable TWAN connection scenarios, EAP extensions are defined to support UE-initiated PDN requests and seamless inter-system handover requests. For the case of multi-PDN capable TWAN scenarios, a WLAN Control Protocol (WLCP) is defined between the UE and TWAN to enable one or more UE PDN connection requests and seamless handover procedures. However, separate procedures are still utilized between the UE and 3GPP AAA Server for UE authentication.

Inter-System Mobility in Integrated Wireless Networks

As the above description illustrates, under current practices, cellular network and WiFi interworking occurs in the PGW. Such interworking is typically slow as it requires access and control by devices within the core of the EPC. Furthermore, communications that are reliant upon processing at the core of the network have an increased opportunity to be disrupted as the communications travel to and from the network core.

Given the anticipated deployment of many co-located small cell and WiFi access points, Applicants have noted that it would be beneficial to standardize some inter-working functionality closer to the small cell and WiFi access points. In some mobility and multi-access scenarios, such a capability could reduce user plane switching delays across access technologies and minimize the amount of signaling through the MCN, i.e., to the PGW.

Applicants disclose herein improved systems and methods for inter-system mobility in integrated wireless networks. More particularly, applicants disclose herein systems and methods for inter-system integration of small cell and WiFi networks. According to one aspect of the disclosed embodiments, the MME existing in the control network of the EPC has been extended to provide a common control plane entity for both LTE and WiFi access, while the SGW, which is also located in the EPC, has been extended to function as a common user plane gateway for both LTE and WiFi access. The disclosed combination of an MME and SGW with corresponding interfaces to the WiFi and LTE access networks may be referred to as an "Integrated Small Cell and WiFi Network" (ISWN). An ISWN may include enhancements to multi-RAT terminal capabilities, small cell and WiFi access capabilities, EPC network elements, and policy/traffic management functions.

The enhanced MME and SGW functionality as disclosed herein result in GTP-based integrated small-cell and WiFi (ISW) connectivity and mobility. In one embodiment, the MME may interact with separate gateways for LTE and WiFi access, i.e., SGW and TWAG respectively, or with an "ISW-enabled" SGW, including a combined SGW/TWAG. The UE interacts with the 3GPP AAA Server for EPC attachment via the TWAN, while the TWAN established connectivity to the PDN according to the procedures described herein.

The disclosed systems and methods improve performance by enabling execution of inter-system mobility procedures close to the edge of the network. Latency is reduced by minimizing the need for signaling procedures deep in the core network, i.e., toward the PGW. The improved performance and reduced latency resulting from the disclosed systems and methods is especially beneficial in environments where an MNO deploys both small cell and WiFi access in a common geographic area. The disclosed systems and methods, by distributing some inter-system mobility functions to the MME and SGW, improve scalability by reducing the processing burden placed on the PGW.

According to one aspect of the disclosed embodiments, communication of an IP data stream or "IP flow" to/from a single PDN may be switched or handed over to another of the LTE or TWAN connections based on local conditions and policies. The "handover" feature allows for selective use of connections for the purpose of optimizing throughput and minimizing resource expense.

According to another aspect of the disclosed embodiments, two concurrent connections to the PDN may be established, one via the LTE and one via WiFi. A "multi-connection" connection feature in the MME/SGW results in improved mobility robustness and reduce handover ping-ponging. The multi-connection aspect of the disclosed embodiments allows for an alternate path to the PDN to be made available as needed without incurring handover setup delays. The availability of alternate communication paths improves the user experience by reducing session interruptions when the primary data path is degraded (which can be a common occurrence given the limited coverage of small cell and WiFi access points).

Figure 2:
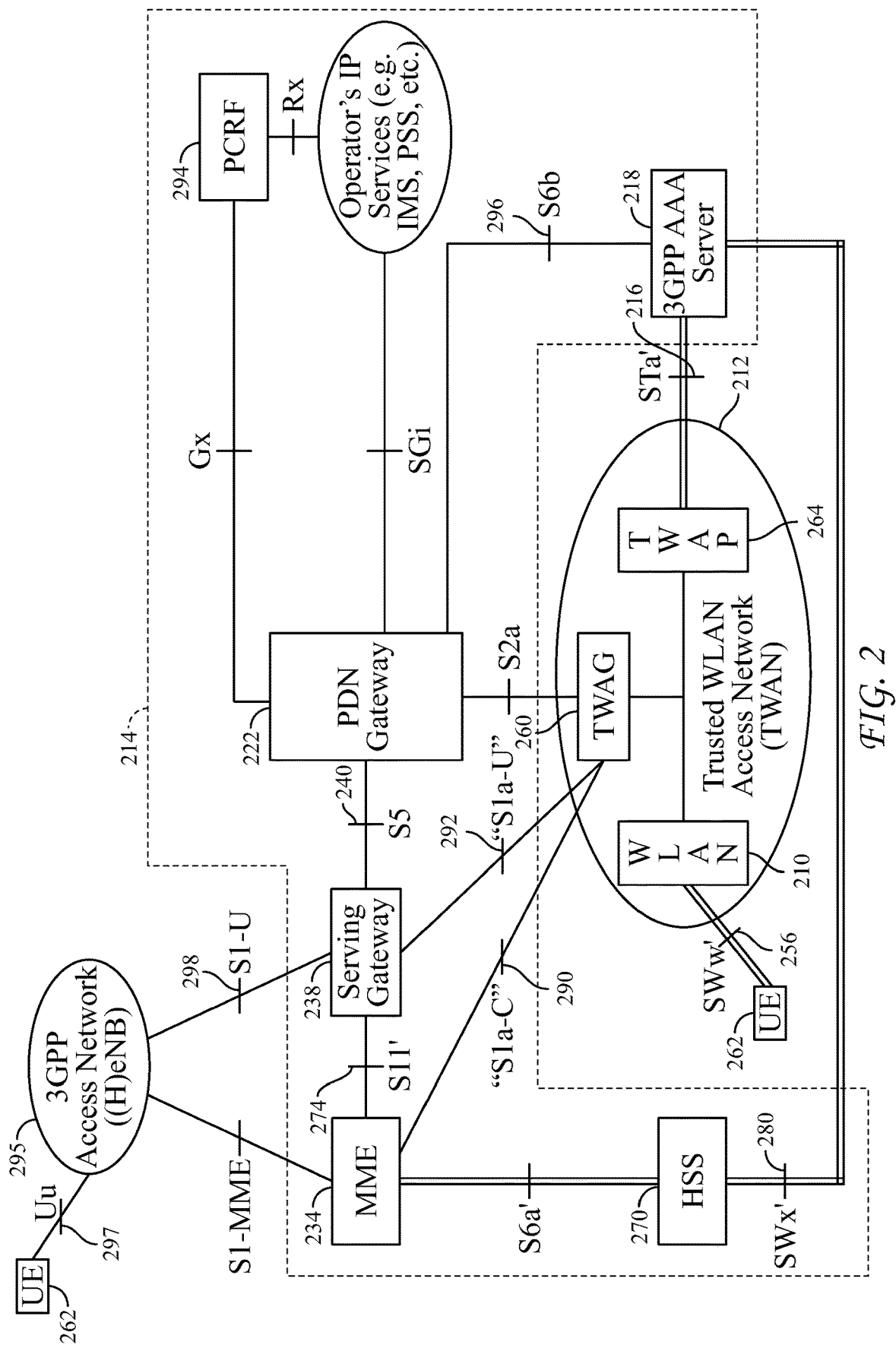
FIG. 2 depicts an example architecture for integrated LTE and TWAN access to a PDN.
Figure 3:
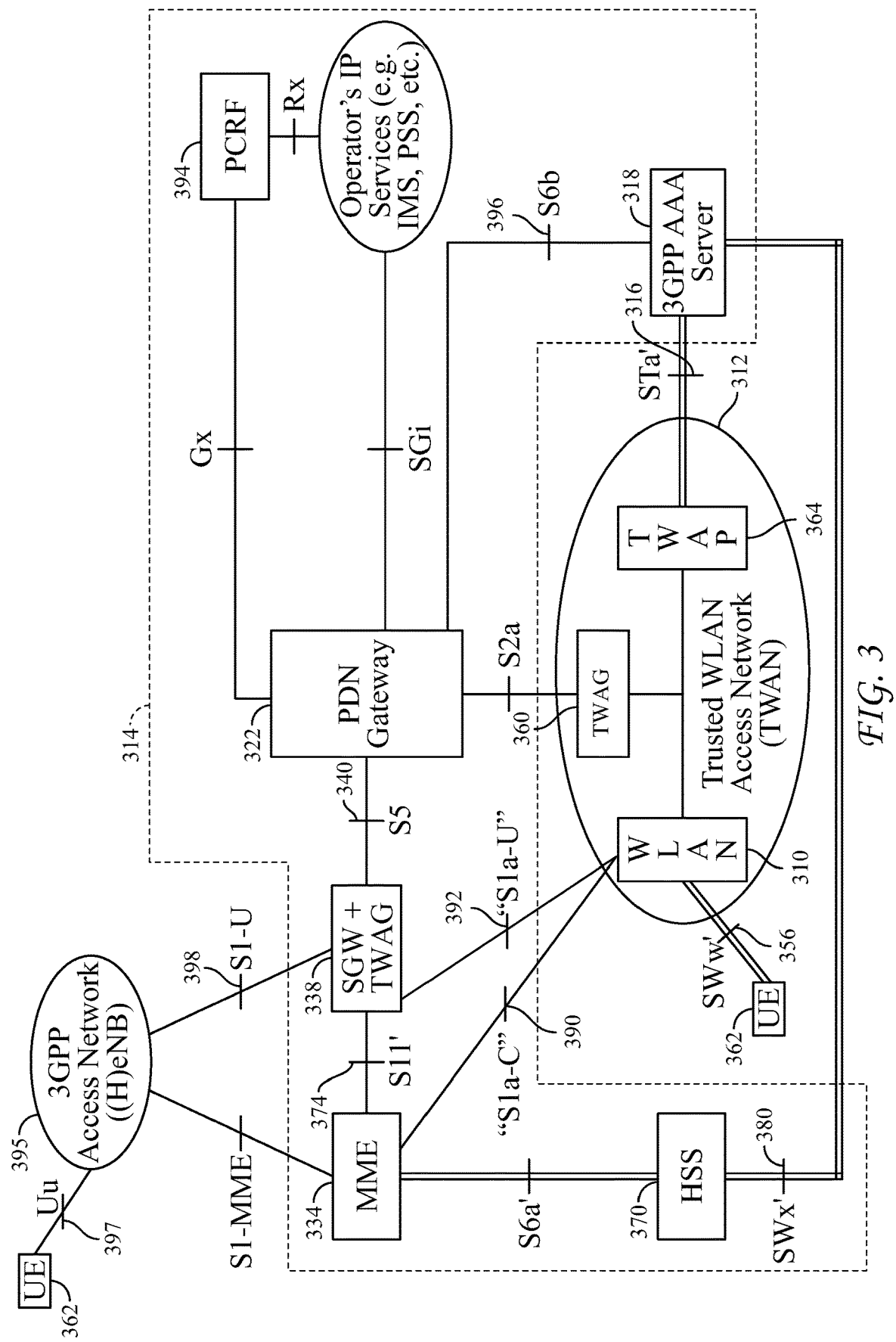
FIG. 3 depicts an example architecture for integrated LTE and TWAN access to a PDN where the TWAG is integrated with the SGW.

Architecture for Inter-System Mobility in Integrated WLAN and LTE Access Networks FIGS. 2 and 3 depict example embodiments of systems for providing inter-system mobility in integrated WLAN and LTE access networks. As shown in FIGS. 2 and 3, both example embodiments comprise a new "S1a-C" control plane interface (290, 390) between the MME (234, 334) and the TWAN (212, 312), and a new "S1a-U" user plane interface (292, 392) between SGW (238, 338) and TWAN (212, 312). With the S1a-C and S1a-U interfaces in place, the MME (234, 334) operates as a common control plane entity for both LTE access network (295, 395) and TWAN (212, 312) access, while the SGW (238, 338) operates as a user plane gateway for both LTE access network (295, 395) and TWAN (212, 312). As described in detail below in connection with FIGS. 4-7, the integrated MME (234, 334) and SGW (238, 338), which continue to be comprised in the core EPC network (214, 314), allow for user equipment (UE) (262, 362) to access the capabilities of a packet data network (PDN) through either the LTE access network (295, 395) or TWAN (212, 312). Moreover, and as described in detail in connection with FIGS. 8 and 10, an existing communication connection between a UE (262, 362) and a PDN (222, 322) may be handed over from one of the LTE access network (295, 395) or TWAN (212, 312) to the other. Still further, and as described below in connection with FIGS. 9 and 11, the MME (234, 334) and SGW (238, 338) provide for simultaneously maintain two communication paths, one via the LTE access network (295, 395) and one via the TWAN (212, 312), between a UE (262, 362) and a PDN (222, 322).

In the embodiment of FIG. 2, the S1a-C 290 and S1a-U 292 interfaces terminate in the TWAG 260 comprised in the TWAN 212. FIG. 3 depicts an alternative embodiment, wherein the functionality that had traditionally been provided by TWAG has been combined with the SGW 338. The combined SGW and TWAG 338 offer the benefit of reducing the number of devices that a communication must traverse between the UE 362 to the PGW 322. In the embodiment of FIG. 3, the S1a-C 390 and S1a-U 392 interfaces terminate in the TWAN 312, but terminate specifically in the WLAN AN 310 rather than the TWAG 260 as in FIG. 2.

In one embodiment of the disclosed systems and methods, the transport network connection on the S1a-C interface between MME and TWAN is established using extensions to Operation, Administration, and Maintenance (OAM) procedures. In embodiments where GTPv2-C is employed as the baseline protocol stack, a User Datagram Protocol (UDP) is established over an IP path for the exchange of subsequent signaling messages on the "S1a-C" interface. In another embodiment, a Stream Control Transport Protocol (SCTP) over IP path may be used.

TWAN, MME and SGW Extensions

The disclosed systems and methods for inter-system mobility support both "single-PDN capable" and "multi-PDN capable" connections (212, 312). In the case of a single-PDN connection, the UE (262, 362) and the core network (214, 314) support one PDN connection via the TWAN (212, 312) or LTE access (295, 395). With respect to a multi-PDN connection, the UE (262, 362) and network (214, 314) support multiple simultaneous PDN connections via the TWAN (212, 312) and LTE access network (295, 395).

For the single-PDN connection scenario, the UE (262, 262) initiates both attach and PDN connection establishment via EAP signaling with the 3GPP AAA Server (218, 318). In one embodiment, the 3GPP AAA Server (218, 318) provides a new ISW-based indication via Diameter signaling extensions to the TWAN (212, 312) (based on reported UE (262, 362) and TWAN (212, 312) capabilities), allowing it to communicate with an enhanced MME (234, 334) via the new S1a-C interface.

For the multi-PDN connection scenario, the UE (262, 362) initiates the attach procedure via EAP signaling with the 3GPP AAA Server (218, 318). However, the PDN connection establishment procedure(s) are initiated via WLCP signaling with the TWAN (212, 312). The TWAN (212, 312) communicates with the enhanced MME (234, 334) to continue the PDN connection setup via the new S1a-C interface.

In addition to establishing the new S1a-C (290, 390) and S1a-U interfaces (292, 392), the disclosed embodiments extend existing protocols. For example, according to an aspect of the disclosed embodiments, the UE (262, 362) and the 3GPP AAA Server (218, 318) may be extended to support exchange of additional EAP signaling information for TWAN access in both single-PDN and multi-PDN capable scenarios. Similarly, the UE (262, 362) and TWAN (212, 312) may be extended to support exchange of additional WLCP signaling for TWAN access in multi-PDN capable scenarios. Also, the MME (234, 334) and TWAN (212, 312) may be extended to support new GTPv2-C based control plane procedures over the new "S1a-C" interface for TWAN PDN connection and bearer establishment. By way of further example, the SGW (238, 338) and TWAN (212, 312) may be extended to support new GTP-U based user plane procedures over the new "S1a-U" interface for bearer traffic between TWAN (212, 312) and SGW (238, 338). In yet another example, the MME (234, 334) and SGW (238, 338) may be extended to support new GTPv2-C based control plane procedures over the S11 (S11') interface for TWAN PDN connection and bearer establishment through the SGW (238, 338).

According to an aspect of the disclosed embodiments, authentication and security procedures are performed consistent with existing standard mechanisms using the STa, SWx, and S6b interfaces that may have been enhanced. For example, the STa (STa') interface between 3GPP AAA Server (218, 318) and TWAN (212, 312) may be extended to enable exchange of additional ISW-based information. Similarly, the SWx (SWx') interface between HSS and 3GPP AAA Server (218, 318) may be extended to enable exchange of additional ISW-based information. Further, the S6a (S6a') interface between the HSS (270, 370) and the MME (234, 334) may be enhanced to enable exchange of additional ISW-based information.

Protocol Extensions

In the disclosed systems and methods, existing protocols and messages may be extended to support the new functionality. For example, existing messages may be extended in order to convey new UE (262, 362) and TWAN (212, 312) capabilities to the 3GPP AAA Server (218, 318). By way of further example, existing messaging may be extended in order to convey UE (262, 362) to PDN connectivity requests to the MME (234, 334) via TWAN (212, 312). Additionally, existing messages may be extended in order to support "multi-connection" indications for an existing UE (262, 362) to PDN connection. The "multi-connection" feature allows a UE (262, 362) to request PDN connectivity via simultaneous access over both cellular and WiFi. In order to support this feature, the UE (262, 362) must be assigned the same IP address for routing of packets to/from the PDN via either access. This is accomplished by adding a "multi-connection" indicator to the EAP, WLCP, NAS, S1-AP and GTP protocols. The UE (262, 362) implementation is responsible for mapping the IP packet to the intended Layer 2 access.

Specific EAP/Diameter Protocol Extensions

According to an aspect of one disclosed embodiment, the EAP and Diameter signaling are extended to allow the UE (262, 362) and TWAN (212, 312) to indicate their expanded capabilities to the 3GPP AAA Server (218, 318).

For the case of inter-system handover in the "single-PDN" connection scenario, the extended EAP signaling described for SaMOG phase-2 already supports use of the "handover" indication along with the "APN" for the PDN connection to be handed over. For the case of inter-system multi-connection, a new indicator for "multi-connection" is defined which provides the "APN" of the PDN to which the connection is being made.

According to an aspect of the disclosed embodiments, with respect to the Diameter protocol elements, the "Access Type" information element is extended to include "ISW-enabled TWAN" as one of the potential access types. The TWAN (212, 312) capability indicates support for local and/or remote TWAG (260) functionality, as well as identifying its connections to ISW-enabled MMEs, if any.

The following chart summarizes various EAP extensions that may be incorporated into the disclosed embodiments.

| Message Direction | EAP Message | New Information Element | Purpose | Comment |
|---|---|---|---|---|
| UE to 3GPP AAA Server | EAP-Response/Identity | Multi-connection capability | Indicates to the network that UE is capable of maintain a PDN connection simultaneously over both LTE and WiFi access | Applies to both "single-PDN" and "multi-PDN" TWAN scenarios |
| 3GPP AAA Server to UE | EAP-Request/AKA-Challenge or EAP-Request/AKA-Notification | Allow/deny use of multi-connection | Allow/deny use of multi-connection | Indicates whether or not the UE is allowed to request multi-connectivity on this network |
| UE to 3GPP AAA Server | EAP-Response/AKA-Challenge | Multi-connection Indication, APN | Indicates to the network that UE want to establish a WiFi connection to support IP flow mobility with a simultaneous LTE connection to the PDN | For "single-PDN" TWAN scenario |

According to another aspect of the disclosed embodiments, the STa interface and Diameter application may be used for authenticating and authorizing the UE for EPC access. The STa interface may also be used to transport GTPv2 related mobility parameters when the UE attaches to the EPC.

The following chart summarizes various Diameter extensions that may be incorporated into aspects of the disclosed embodiments.

| Message Direction | Diameter Message | New/Modified Information Element (IE) | Purpose | Comment |
|---|---|---|---|---|
| TWAN to 3GPP AAA Server (STa) | Diameter-EAP-Request (DER) | EAP Payload | Modified to support EAP extensions listed in the above table relating to EAP extensions | |

-continued

| Message Direction | Diameter Message | New/Modified Information Element (IE) | Purpose | Comment |
|---|---|---|---|---|
| 3GPP AAA Server to TWAN (STa) | Diameter-EAP-Answer (DEA) | Access Type: "ISW TWAN" | May define "ISW-TWAN" as a new Access Type; alternatively, the ISW-TWAN capability may be included in a new "ISW capability" IE as shown below | |
| | | ISW Capabilities | New IE providing the following info: ISW-capable Connected MME(s) Local and/or remote TWAG support | |
| | | EAP Payload | Modified to support EAP extensions listed in the above table relating to EAP extensions | |
| | | ISW Usage Authorization | New IE providing the following info: Use ISW-enabled MME (S1a-C) or legacy PGW (S2a) If using S1a-C, use local or remote TWAG | |

WLCP Protocol Extensions

Generally, the NAS Session Management (SM) protocol defined in 3GPP TS 24.008, the contents of which are hereby incorporated herein by reference, discloses the WLCP protocol that may be used to implement the systems and methods disclosed herein. According to one embodiment, the Activate PDP Context Request/Accept/Reject and Deactivate PDP Context Request/Accept message types may be adapted as needed to accommodate the described processing. The WLCP Stage 3 specification is 3GPP TS 24.244, the contents of which are hereby incorporated by reference herein in their entirety.

With respect to inter-system handover in the "multi-PDN" scenario, the WLCP signaling described for SaMOG phase-2 supports use of a "handover" request type along with an identification of the "APN" for the PDN connection to be handed over. In connection with processing of a request for an inter-system multi-connection, a new indicator for "multi-connection" may be defined which includes the "APN" for the PDN connection with which the connection is to be made.

The following chart summarizes WCLP extensions that may incorporated into embodiments of the disclosed systems and methods.

| Message Direction | WLCP Message | New/Modified Information Element | Purpose | Comment |
|---|---|---|---|---|
| UE to TWAN | PDN Connectivity Request | Request Type- add "multi-connection" to existing "initial" and "handover" request types | Indicates to the network that UE wants to maintain a PDN connection simultaneously over both LTE and WiFi access | Applies only to "multi-PDN" TWAN scenarios |

NAS Protocol Extensions

With respect to the non-access stratum (NAS) protocol, a new indicator for "multi-connection" is defined. When the UE has an existing PDN connection via TWAN, the UE may request a "multi-access connection" via extensions to the LTE attach and PDN connection procedures specified in 3GPP TS 23.401, the contents of which are hereby incorporated herein by reference. In addition to the initial attach and handover indication, the disclosed systems and methods may employ a multi-connection indication.

The following chart summarizes the NAS extensions that may incorporated into embodiments of the disclosed systems and methods.

| Message Direction | NAS Message | New/Modified Information Element | Purpose | Comment |
|---|---|---|---|---|
| UE to MME | Attach Request | ESM Message Container/Request Type-add "multi-connection" to existing "initial" and "handover" request types | Indicates to the network that UE wants to maintain a PDN connection simultaneously over both LTE and WiFi access | Applies to initial PDN connection triggered by Attach Request |
| UE to MME | PDN Connectivity Request | Request Type-add "multi-connection" to existing "initial" and "handover" request types | Indicates to the network that UE wants to maintain a PDN connection simultaneously over both LTE and WiFi access | Applies to subsequent PDN connections established after initial attach |

GTPv2-C Protocol Extensions

The GTPv2-C protocol may also be extended in connection with the systems and methods disclosed herein. For example, the indication flags in the GTP-C "Create Session Request" may be expanded to include a value for "multi-connection" in addition to the existing "handover indication".

As noted above in connection with FIG. 3, in an embodiment where the SGW and TWAG functionality have been combined, the S1a-C interface terminates in the WLAN AN function of the "TWAN." In such embodiments, additional information such as a UE MAC address and a VLAN ID may need to be conveyed via the GTPv2-C signaling to the ISW-enabled combined SGW+TWAG.

The following chart summarizes the GTPv2-C extensions that may be incorporated into embodiments of the disclosed systems and methods.

| Message Direction | GTPv2-C Message | New/Modified Information Element | Purpose | Comment |
|---|---|---|---|---|
| TWAN to MME (S1a-C) | Create Session Request | Indication Flags-add "multi-connection" indication in addition to existing "handover" indication | Indicates to the network that UE wants to maintain a PDN connection simultaneously over both LTE and WiFi access | |
| | | WLAN 802.11 MAC Address, UE 802.11 MAC Address, Session VLAN ID | Facilitates packet routing and tunnel management when WLAN interfaces directly with combined SGW + TWAG | |
| MME to SGW (S11) | Create Session Request | Indication Flags-add "multi-connection" indication in addition to existing "handover" indication | Indicates to the network that UE wants to maintain a PDN connection simultaneously over both LTE and WiFi access | |
| | | WLAN 802.11 MAC Address, UE 802.11 MAC Address, Session VLAN ID | Facilitates packet routing and tunnel management when WLAN interfaces directly with combined SGW + TWAG | |
| | | Access routing policy | In case of multi-connection, MME includes this IE to indicate IP routing preferences to SGW | |

Network Element Extensions
TWAN and 3GPP AAA Server Extensions

The TWAN (212, 312) and 3GPP AAA server (218, 318) may be extended in order to provide the processing as described herein. For example, according to one embodiment, the 3GPP AAA Server (218, 318) becomes aware of the TWAN's ISW network capabilities via new Diameter signaling information that is received from the TWAN (212, 312) over the STa interface. In an example scenario, the "Access Type" information element in the STa "Access Authentication and Authorization Request," which is described in 3GPP TS 29.273, the contents of which are hereby incorporated by reference, may be extended to include "ISW-TWAN" in the instance that the TWAN supports the MME/SGW interworking capability. Additionally, the "Access Type" information may indicate support for a local TWAG or a remote SGW/TWAG, and identify a list of MMEs connected via S1a-C.

In an example embodiment, the 3GPP AAA Server (218, 318) allows use of an ISW-enabled MME by the TWAN using a new Diameter signaling indication over the STa interface. Relying upon considerations such as TWAN capabilities, UE connection status, known network topology, etc., the 3GPP AAA Server (218, 318) determines whether or not the TWAN (212, 312) connection should be established directly over the existing S2a interface with the PGW per legacy procedures, or via an ISW-enabled MME (234, 334) and SGW (238, 338) per new procedures over the proposed "S1a-C" and "S1a-U" interfaces, respectively.

According to an aspect of the disclosed embodiments, the HSS (270, 370) is updated with the latest UE connectivity information such as, for example, the MME address, SGW address, PGW address, etc. In the example scenario where the UE (262, 362) attempts to attach via TWAN (212, 312), the 3GPP AAA Server (218, 318) retrieves the latest UE subscription and connection information. If the UE (262, 362) is already connected to an ISW-enabled MME (234, 334) and SGW (238, 338) via LTE access, the same MME (234, 334) and/or SGW (238, 338) may be preferred for use via the TWAN access. In the scenario where the UE (262, 362) is in the vicinity of LTE and TWAN access points capable of sharing the same MME and/or SGW, the ISW-enabled MME and/or SGW may be preferred.

MME Extensions

The MME (234, 334) is adapted to provide integrated small-cell and WiFi (ISW) capabilities. For example, in the scenario where the S1a-C interface option is selected, the TWAN (212, 312) uses the ISW-enabled MME (234, 334) to establish a PDN connection from the TWAN (212, 312) to the PGW (222, 322) via an ISW-enabled SGW (238, 338). This processing involves new GTP-based signaling between the TWAN (212, 312) and MME (234, 334) via the newly proposed "S1a-C" interface and a new user plane path between the TWAN (2312, 312) and SGW (238, 338) via the newly proposed "S1a-U" interface.

The MME (234, 334) is adapted to handle the new information elements provided in the extended GTP-C protocols over the S1a-C interface with the TWAN.

In an embodiment wherein the SGW and TWAG have been combined, the S1a-C interface terminates in the WLAN AN 310 function of the TWAN 312. As such, the MME 334 processes any new information elements from the extended GTP-C signaling (e.g., UE MAC address, VLAN ID) in order to facilitate routing of packets between the UE 362 and SGW 338. This information, along with possible access routing policies, are conveyed to the ISW-enabled SGW 338 via modified GTPv2-C signaling on the S11' interface. In the scenario wherein the purpose or reason for the session request includes a "multi-connection" indication, the SGW 338 may perform IP flow mobility procedures based on the MME-provided policy as further described below.

SGW Extensions

The SGW (238, 338) has likewise been adapted to provide integrated small-cell and WiFi (ISW) capabilities. In particular, the SGW (238, 338) is adapted to process new ISW-related information provided by the MME (234, 334) via extended GTPv2-C signaling over the S11' interface.

In an embodiment such as depicted in FIG. 3, where the S1a-U interface terminates in the WLAN AN 310 function of the TWAN 312, the SGW 338 supports or provides some of the functionality that typically has been provided by the TWAG. In such embodiments, the SGW 338 processes any new information elements from the extended GTPv2-C signaling (e.g., UE MAC address, VLAN ID) in order to facilitate routing of packets between the PGW 332 and UE 362.

In scenario where a session request signaled by the extended GTPv2-C signaling includes a "multi-connection" indication, the SGW 338 performs IP flow mobility procedures, possibly based on new access routing policies provided by the MME 334. For instance, in an example embodiment, the SGW 338 policy may be configured to send downlink packets via the same access for which the corresponding uplink packets were received. In this case, the SGW 338 may associate the "5-tuple" for each uplink packet flow with the access network on which they were received (LTE or WiFi), and send the corresponding downlink packets via the same access. The 5-tuple consists of the Source IP Address, Source Port Number, Destination IP Address, Destination Port Number, and Transport Protocol Type (e.g., UDP, TCP). For example, if previous uplink UDP packets with source IP address="a", source port number="b", destination IP address="x", and destination port number="y" were received via WiFi, subsequent downlink UDP packets with source IP address="x", source port number="y", destination IP address="a", and destination port number="b" will also be sent via WiFi. Alternatively, the downlink packets may be sent via any available access independently from uplink packets.

HSS Extensions

In an example embodiment, the HSS (270, 370) is adapted to store information identifying that the MME (234, 334) and SGW (238, 338) are "ISW-enabled".

UE Extensions

The UE (262, 362) is adapted to initiate attach, handover, and multi-connection requests based on ANDSF policies, ANQP information, local conditions, etc. With respect to providing simultaneous connectivity over multiple networks, i.e. TWAN and LTE, the UE is adapted to handle the mapping of IP packets to the appropriate Layer 2 interface, i.e., LTE or WiFi.

Integrated Small-Cell and WiFi (ISW) Processing

The system architectures described above in connection with FIGS. 2 and 3 are adapted to provide inter-system mobility in integrated WLAN and LTE access networks. The disclosed example embodiments comprise a new "S1a-C" control plane interface (290, 390) between the MME (234, 334) and the TWAN (212, 312), and a new "S1a-U" user plane interface (292, 392) between SGW (238, 338) and TWAN (212, 312). With the S1a-C and S1a-U interfaces in place, the MME (234, 334) operates as a common control plane entity for both LTE access network (295, 395) and TWAN (212, 312) access, while the SGW (238, 338) operates as a user plane gateway for both LTE (295, 395) and TWAN (212, 312).

FIGS. 4-11 provide flow diagrams for example processing performed by the systems depicted in FIGS. 2 and 3 in providing inter-system mobility. More particularly, FIGS. 4-7 depict processing relating to a UE attaching to PDN through either a TWAN or LTE access network. FIGS. 8 and 10 depict processing relating to handing over an existing communication connection between a UE and a PDN from one of the LTE access network or TWAN to the other. FIGS. 9 and 11 depict processing relating to establishing two simultaneous communication paths, one via the LTE access network and one via the TWAN, between a UE and a packet network.

TWAN Connections Via ISW-Enabled TWAN, MME and SGW

The disclosed systems are adapted to establish a communication path to a PDN via a TWAN. In one embodiment of the disclosed systems and methods, the TWAN connection may be a "single-PDN" TWAN connection. In another embodiment, the TWAN connection may be a "multi-PDN" TWAN connection as used in SaMOG phase-2.

In an embodiment where the TWAN services a multi-PDN connection, separate "attach" and "PDN connection establishment" procedures are employed consistent with section 16 of 3GPP TS 23.402 v 12.3.0, the contents of which are hereby incorporated herein by reference. The "attach" procedures (attach, detach) are performed via extended EAP signaling while the "PDN connection" procedures (activation, deactivation) are performed by the SaMOG phase-2 WLAN Control Protocol (WLCP).

In addition to supporting standard SaMOG phase-2 capabilities (UE-initiated PDN connection, multiple PDN connections, concurrent NSWO and TWAN PDN connections, IP address preservation for seamless inter-system handover), the disclosed systems and methods are also adapted to support establishing TWAN to PDN connections via ISW-enabled MMEs and ISW-enabled SGWs.

Initial Attach Via TWAN

Before a UE may communicate with a PDN or EPC, the UE must attach to the PDN or EPC. The disclosed systems and methods support attaching via the TWAN. The procedures for attaching may vary depending upon whether the TWAN supports a "single-PDN" or "multi-PDN" connection, or whether the TWAG functionality is located in the TWAN or the SGW. The disclosed systems and methods are adapted to support all such embodiments. Processing associated with attaching via the TWAN under various different conditions is described below in connection with FIGS. 4-7.

Figure 4A:
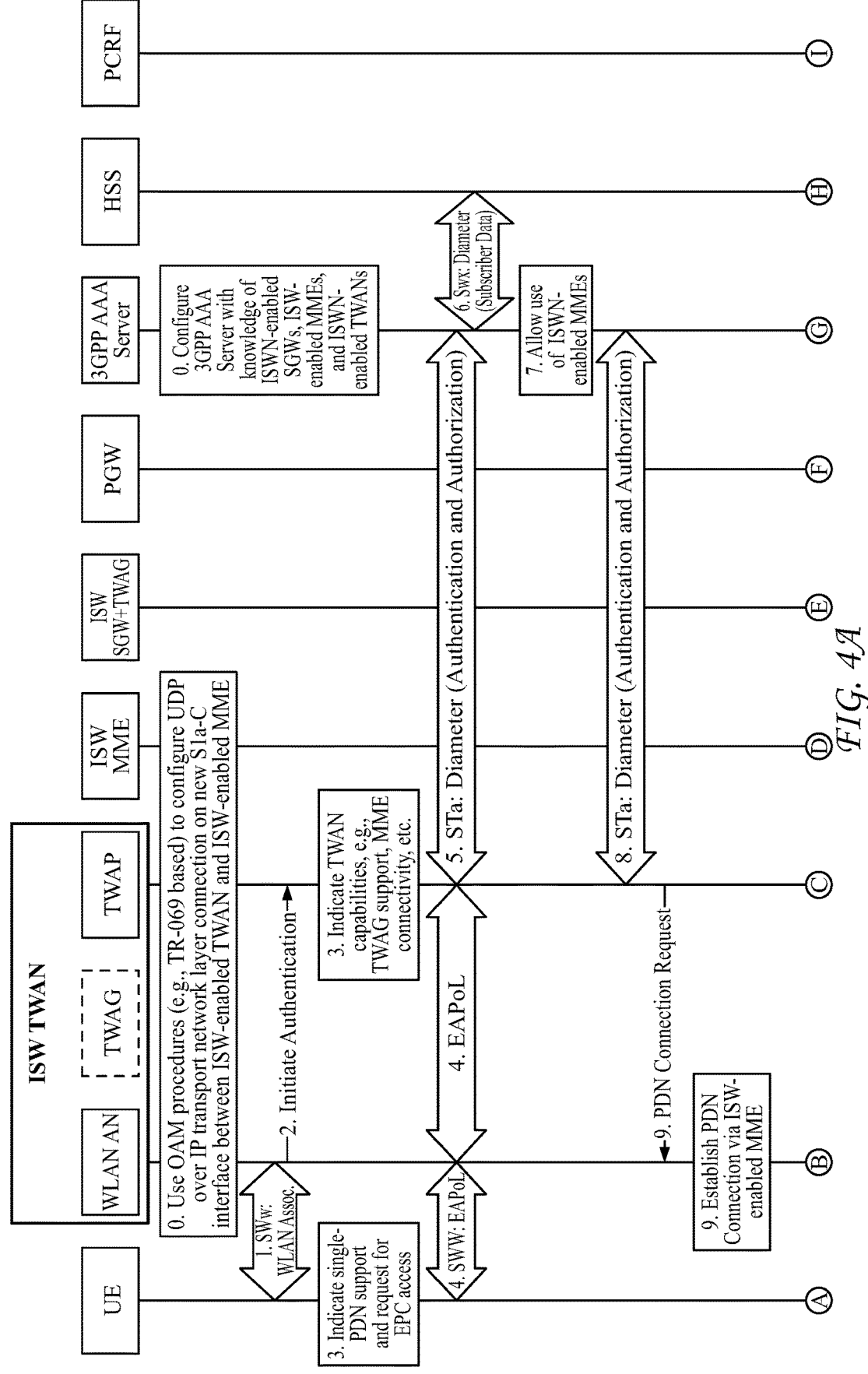
FIGS. 4A-B provide a diagram depicting, for a single-PDN connection, example processing associated with a UE attaching via a TWAN to a PDN where the TWAG is integrated with the SGW.
Figure 4B:
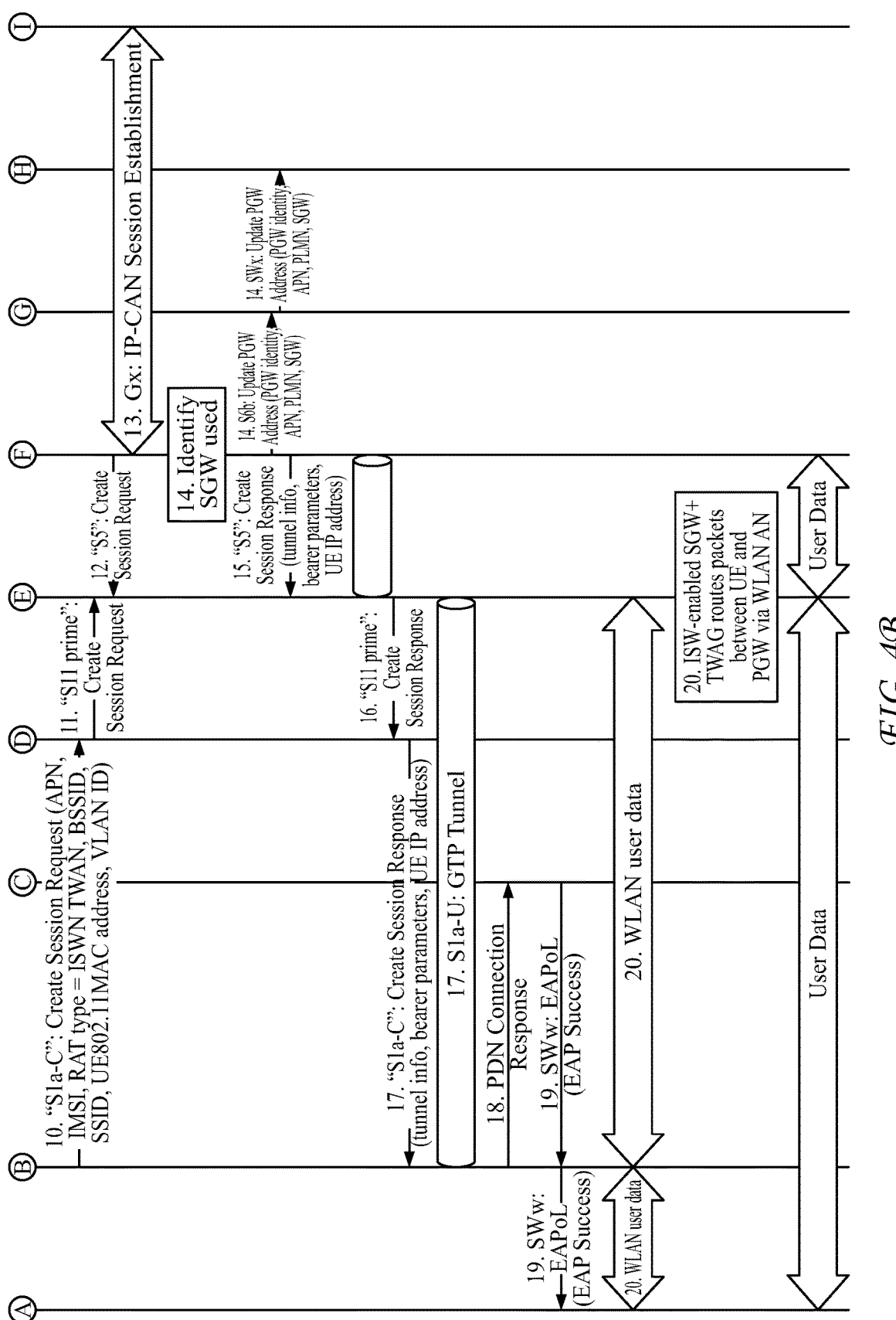

Initial TWAN Attach with Single-PDN Connection Capability Via Extended MME and Combined SGW+TWAG FIGS. 4A-B depict a flow diagram depicting example processing associated with a UE attaching to a PDN via a TWAN. More particularly, the processing corresponds to an example system embodiment such as is depicted in FIG. 3 wherein the TWAN 312 supports a single-PDN connection 322 and wherein the TWAG functionality is located in the SGW 338. In the processing depicted in FIGS. 4A-B, an ISW-enabled MME 334 and ISW-enabled combined SGW+TWAG 338 provide attachment to PDN gateway (PGW) 322 via TWAN 312. During processing, the 3GPP AAA Server 318 provides the TWAN 312 with an indication that an ISW-enabled MME 334 may be used if available. The WLAN AN 310 exchanges control signaling directly with the MME 334, while user plane traffic is exchanged directly between WLAN AN 310 and the combined SGW+TWAG 338.

Anchoring the UE 362 on a combined SGW+TWAG 338 may provide benefits when the UE 362 requests a handover or an inter-system multi-connection to the same PDN. Allowing the MME 334 to control the TWAN connection via the ISW-enabled combined SGW+TWAG 338 enables the MME 334 to perform new inter-system mobility management functions thereby reducing the signaling load on the PGW 332.

Referring to FIG. 4A, at step 0, as a preliminary matter, the transport network layer (TNL) connection is or previously has been established between TWAN 312 and MME 334 which may be performed using, for example, using OAM. In an example scenario, OAM procedures, such as TR-069, may be used to configure UDP over an IP transport network layer connection on the S1a-c interface between TWAN 312 and MME 334. Also at step 0, the 3GPP AAA Server 318 is configured with and maintains information about the ISW-enabled MMEs 334, ISW-enabled SGWs 338, and ISW-enabled TWANs 312. In previously existing systems, 3GPP AAA servers manage WLAN network access but do not manage or track MMEs and SGWs as they currently pertain to LTE access only.

Referring to FIG. 4A, at step 1, the UE 362 associates to a WiFi access point (AP) that is part of an operator's Trusted WLAN Access Network (TWAN) 312. The association occurs via standard IEEE 802.11 procedures via the SWw interface 356. The UE 362 may discover and attempt association with this WiFi AP based on pre-configured information, ANDSF policies, ANQP signaling, etc. In the scenario where the UE 362 has an existing PDN connection via LTE access, the requested connection results in multiple access PDN connectivity "MAPCON," i.e., simultaneous use of cellular and WiFi access for PDN connectivity.

The attach-related processing may be initiated by the UE 362 via EAP per the current SaMOG phase-2 "single-PDN connection" solution. In this scenario, the attach procedure is combined with establishment of a PDN connection to the UE-specified APN, or to the default APN if none was specified by the UE 362.

Referring again to FIG. 4, at step 2, an internal message triggered by the WLAN AN 310 within the TWAN 312 may initiate the authentication procedure via the Trusted WLAN AAA Proxy (TWAP) 364.

At step 3, the UE 362 determines the type of connection that should be requested based on its capabilities. In the scenario depicted in FIG. 4A, it is assumed that a SaMOG phase-2 "single-PDN" connection type is requested. Also at step 3, the TWAN 312 identifies its capabilities such as, for example, its local/remote TWAG support, MME connectivity, etc.

At step 4, the TWAP 364 retrieves identity information from the UE 362 using standard EAPoL procedures over the SWw interface 356.

At step 5, the TWAP 364 generates and transmits a Diameter-EAP-Request to the 3GPP AAA Server 318 over the STa interface 316. The request may comprise any suitable information including, for example: mandatory information elements for User Identity, EAP Payload, Authentication Request Type, UE Layer 2 Address, Access Type, and Access Network Identity; conditional information elements for Mobility Capabilities; and optional information elements for Terminal Information and WLAN Identifier.

In an example scenario, the EAP Payload of the request may contain an indication of the UE's 362 "single-PDN"

support per the SaMOG phase-2 solution described in 3GPP TR 23.852 v12.0.0, the contents of which are hereby incorporated by reference herein in its entirety.

In an example scenario, the request values for Access Type that may be included in the request may include "ISW-WLAN" for the case where the TWAN 312 supports integration with 3GPP access as described herein. In another scenario, the definition of the Access Network Identifier is extended to allow inclusion of the value "ISW-WLAN" as the Access Network ID (ANID) Prefix.

In an example scenario, Additional TWAN capabilities may be included in the request. For example, the request may specify support for local TWAG or remote combined TWAG+SGW along with a list of connected MMEs, if any.

Still further, in an example scenario, the request may include an optional Terminal Information element which includes additional information about the UE's ISW capability. The Terminal Information element may not be needed if all the relevant UE capability information is exchanged via extensions to the EAP payload.

Referring to FIG. 4A, at step 6, in the situation the 3GPP AAA Server 318 requires additional information about the subscriber such as, for example, previous connectivity status, it retrieves this information from the HSS 370 using the Diameter protocol on the SWx interface 380.

At step 7, using the information regarding the ISW-enabled SGWs and TWAN that was provided in the request or retrieved from HSS, the 3GPP AAA Server 318 determines to allow the TWAN 312 to utilize its S1a-C connection 392 with the MME 334 for establishment of the PDN connection.

At step 8, the 3GPP AAA Server 318 generates and transmits the Diameter-EAP-Answer to the TWAP 364 over the STa interface 316 including an indication allowing for PDN connection establishment via the ISW-enabled MME 334.

At step 9, the TWAP 364 generates and transmits an internal message to the WLAN AN 310 informing it to set up a GTP tunnel with an SGW 338 via the ISW-enabled MME 334.

At step 10 shown on FIG. 4B, the WLAN AN 310 sends a GTP-C Create Session Request message to the ISW-enable MME 334 over the S1a-C interface 390. The message may comprise, for example, APN, IMSI, RAT type (e.g., ISW-WLAN), BSSID, SSID, etc.

A step 11, the MME 334 sends the Create Session Request message to the selected SGW 338 via the S11' ("prime") interface 374 which has been modified or extended to support the communications between MME 334 and SGW 338 as described herein. In an example scenario, the MME 334 chooses the combined ISW-enabled SGW+TWAG 338. In an alternative scenario, such as one described in connection with FIG. 2, the MME may select a TWAG located within TWAN 312.

Referring to step 12 of FIG. 4B, the combined SGW+TWAG 338 uses the received information to select the PGW 322. The SGW+TWAG 338 transmits a GTP-C Create Session Request message to the selected PGW 322 over the S5 interface 340.

At step 13, if dynamic policy and charging control (PCC) is implemented, the PGW 322 communicates the session establishment to the Policy and Charging Rules Function (PCRF) 394 in order to retrieve the QoS and charging rules. The PGW 322 enforces these rules as needed. If dynamic PCC is not implemented, such rules may be pre-configured in the PGW 322.

At step 14, the PGW 322 uses the S6b interface 396 to update the 3GPP AAA Server 318 with the associated PGW 322 connectivity information for the UE 362. In addition, it also provides the associated information for the combined SGW+TWAN 338. The 3GPP AAA Server 318 subsequently updates the Home Subscriber System (HSS) 370 with this information via the SWx interface 380.

At step 15, the PGW 322 generates and transmits a GTP-C Create Session Response message to the SGW 338 over the S5 interface 340. The response message comprises any information that is needed for further processing including, for example, GTP tunnel information, bearer parameters, and the allocated UE IP address. The GTP tunnel between the PGW 322 and SGW 338 is thereby established.

At step 16, the SGW 338 transmits the GTP-C Create Session Response message to the MME 334 over the modified S11' ("prime") interface 374. The message comprises any information needed for further processing including, for example, GTP tunnel information, bearer parameters, and the allocated UE IP address.

At step 17, the MME 334 transmits the GTP-C Create Session Response message to the WLAN AN 310 over the S1a-C interface 390. The message comprises any suitable information including, for example, GTP tunnel information, bearer parameters, and the allocated UE IP address.

At step 18, the WLAN AN 310 generates and transmits an internal message to the TWAP 364 informing it that the S1a-U 392 bearer has been successfully established.

At step 19, the TWAP 364 communicates the completion of the attach procedure to the UE 362 via an EAP Success indication in the EAPoL message transmitted over the SWw interface 356.

At step 20, the UE 362 may receive its IPv4 address from the WLAN AN 310 via DHCPv4. The WLAN AN 310 provides the UE 362 with its IP address as previously delivered in the GTP-C Create Session Response. Thereafter, the WLAN AN 310 routes packets between UE 362 and PGW 322 via the ISW-enabled combined SGW+TWAG 338.

Figure 5A:
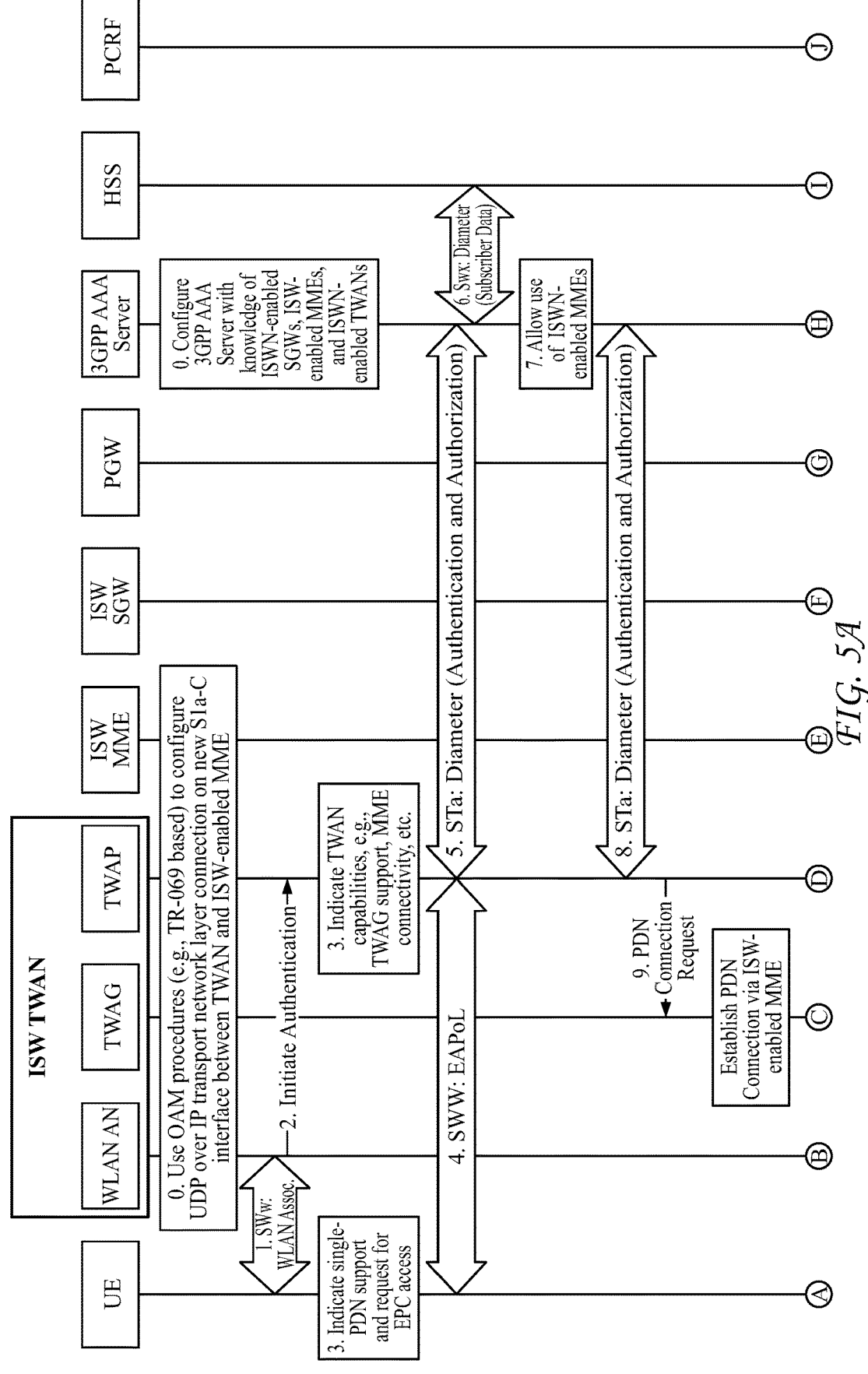
FIGS. 5A-B provide a diagram depicting, for a single-PDN connection, example processing associated with a UE attaching via a TWAN to a PDN where the TWAG is separated from the SGW.
Figure 5B:
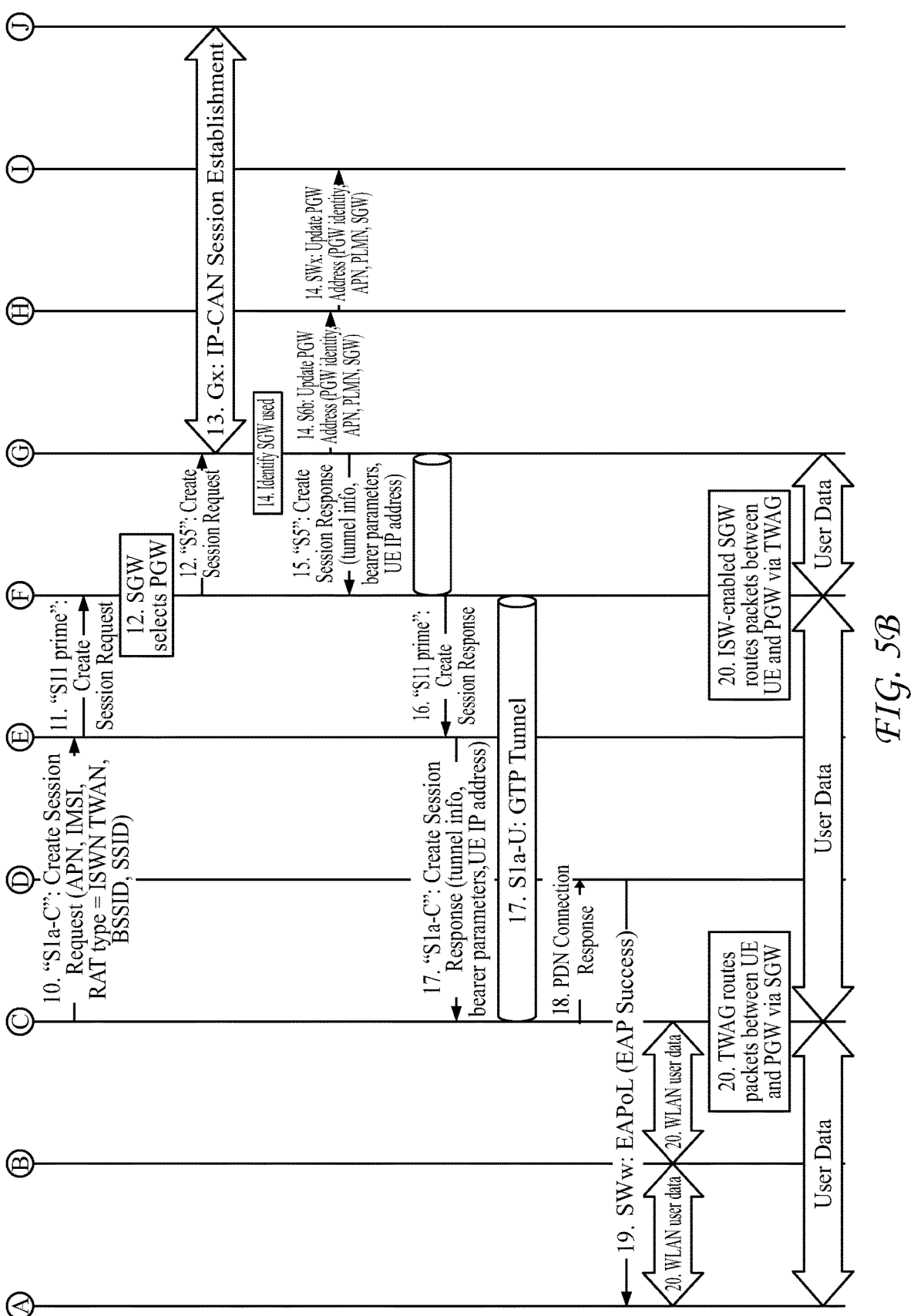

Initial TWAN Attach with Single-PDN Connection Capability Via Extended MME, Standalone TWAG and Standalone SGW In the example architecture of FIG. 2, the TWAG 260 is located in the TWAN 212 rather than in the SGW as in FIG. 3. FIGS. 5A-B provide a flow diagram depicting example processing associated with a UE attaching to a PDN via a TWAN in a system such as depicted in FIG. 2. More particularly, FIGS. 5A-B depict processing in an example system embodiment wherein the TWAN 212 supports a single-PDN connection 222 and wherein the TWAG functionality is located in the TWAN 212. TWAG functionality in this embodiment is analogous to the HeNB Gateway function in LTE access networks. Namely the TWAG 260 carries control plane signaling between the WLAN AN 210 and MME 234, and user plane traffic between the WLAN AN 210 and SGW 238.

Referring to FIG. 5A, at step 0, as a preliminary matter, the transport network layer (TNL) connection is, or previously has been, established between TWAN 212 and MME 234 which may be performed using, for example, using OAM. The 3GPP AAA Server 218 is configured with and maintains information about the ISW-enabled MMEs 234, ISW-enabled SGWs 238, and ISW-enabled TWANs 212.

Referring to FIG. 5A, at step 1, the UE 262 associates to a WiFi access point (AP) that is part of an operator's Trusted WLAN Access Network (TWAN) 212. The association occurs via standard IEEE 802.11 procedures via the SWw interface 256. The UE 262 may discover and attempt association with this WiFi AP based on pre-configured information, ANDSF policies, ANQP signaling, etc. In the scenario where the UE 262 has an existing PDN connection via LTE access, the requested results in multiple access PDN connectivity "MAPCON," i.e., simultaneous use of cellular and WiFi access for PDN connectivity.

The attach-related processing may be initiated by the UE 262 via EAP per the current SaMOG phase-2 "single-PDN connection" solution. In this scenario, the attach procedure is combined with establishment of a PDN connection to the UE-specified APN, or to the default APN if none was specified by the UE 262.

Referring again to FIG. 5A, at step 2, an internal message triggered by the WLAN AN 310 within the TWAN 212 may initiate the authentication procedure via the Trusted WLAN AAA Proxy (TWAP) 264.

At step 3, the UE 262 determines the type of connection that should be requested based on its capabilities. In the scenario depicted in FIG. 5A, it is assumed that a SaMOG phase-2 "single-PDN" connection type is requested. Also at step 3, the TWAN 212 identifies its capabilities such as, for example, its local/remote TWAG support, MME connectivity, etc.

At step 4, the TWAP 264 retrieves identity information from the UE 262 using standard EAPoL procedures over the SWw interface 256.

At step 5, the TWAP 264 generates and transmits a Diameter-EAP-Request to the 3GPP AAA Server 218 over the STa interface 216. The request may comprise any suitable information including, for example: mandatory information elements for User Identity such as EAP Payload, Authentication Request Type, UE Layer 2 Address, Access Type, and Access Network Identity; conditional information elements for Mobility Capabilities; and optional information elements for Terminal Information and WLAN Identifier.

In an example scenario, the EAP Payload of the request may contain an indication of the UE's 362 "single-PDN" support per the SaMOG phase-2 solution described in 3GPP TR 23.852 v 12.0.0.

In an example scenario, the request values for Access Type that may be included in the request may include "ISW-WLAN" for the case where the TWAN 212 supports integration with 3GPP access as described herein. In another scenario, the definition of the Access Network Identifier is also extended to allow inclusion of the value "ISW-WLAN" as the Access Network ID (ANID) Prefix.

In an example scenario, Additional TWAN capabilities may be included in the request. For example, the request may specify support for local TWAG or remote TWAG+ SGW along with a list of connected MMEs, if any.

Still further, in an example scenario, the request may include an optional Terminal Information element which includes additional information about the UE's ISW capability. The Terminal Information element may not be needed if all the relevant UE capability information is exchanged via extensions to the EAP payload.

Referring to FIG. 5A, at step 6, in the situation the 3GPP AAA Server 218 requires additional information about the subscriber such as, for example, previous connectivity status, it retrieves this information from the HSS 270 using the Diameter protocol on the SWx interface 280.

At step 7, using the information regarding the ISW-enabled SGWs and TWAN that was provided in the request or retrieved from HSS, the 3GPP AAA Server 218 determines to allow the TWAN 212 to utilize its S1a-C connection 290 with the MME 234 for establishment of the PDN connection.

At step 8, the 3GPP AAA Server 218 generates and transmits the Diameter-EAP-Answer to the TWAP 264 over the STa interface 216 including an indication allowing for PDN connection establishment via the ISW-enabled MME 234.

At step 9, the TWAP 264 generates and transmits an internal message to the Trusted WLAN Access Gateway (TWAG) 260 informing it to set up a GTP tunnel with an SGW 238 via the ISW-enabled MME 234.

At step 10, the TWAG 260 sends a GTP-C Create Session Request message to the ISW-enabled MME 234 over the S1a-C interface 290. The message may comprise, for example, information specifying APN, IMSI, RAT type (e.g., ISW-WLAN), BSSID, SSID, etc.

At step 11, the MME 234 transmits the Create Session Request message to the selected SGW 238 via the modified S11' ("prime") interface 274 which has been modified or extended to support the communications between MME 234 and SGW 238 as described herein.

At step 12, the SGW 238 uses the received information to select the PGW 222. The SGW 238 transmits a GTP-C Create Session Request message to the selected PGW 222 over the S5 interface 240.

At step 13, if dynamic policy and charging control (PCC) is implemented, the PGW 222 communicates the session establishment to the Policy and Charging Rules Function (PCRF) 294 in order to retrieve the QoS and charging rules. The PGW 222 enforces these rules as needed. If dynamic PCC is not implemented, such rules may be pre-configured in the PGW 222.

At step 14, the PGW 222 uses the S6b interface to update the 3GPP AAA Server 218 with the associated PGW 222 connectivity information for the UE 262. In addition, it also provides the associated SGW information. The 3GPP AAA Server 218 subsequently updates the Home Subscriber System (HSS) 270 with this information via the SWx interface 280.

At step 15, the PGW 222 sends the GTP-C Create Session Response message to the SGW 238 over the S5 interface 240. The response message comprises any information that is needed for further processing including, for example, GTP tunnel information, bearer parameters, and the allocated UE IP address. The GTP tunnel between the PGW 222 and SGW 238 is thereby established.

At step 16, the SGW 238 transmits the GTP-C Create Session Response message to the MME 234 over the modified S11' ("prime") interface 274. The message comprises any information needed for further processing including, for example, GTP tunnel information, bearer parameters, and the allocated UE IP address.

At step 17, the MME 234 transmits the GTP-C Create Session Response message to the TWAG 260 over the S1a-C interface 290. The message comprises any suitable information including, for example, GTP tunnel information, bearer parameters, and the allocated UE IP address.

At step 18, the TWAG 238 generates and transmits an internal message to the TWAP 264 informing it that the S1a-U 292 bearer has been successfully established.

At step 19, the TWAP 264 communicates completion of the attach procedure to the UE 262 via the EAP Success indication in the EAPoL message over the SWw interface 2566.

At step 20, the UE 262 may receive its IPv4 address from the TWAG 260 via DHCPv4. The TWAG 260 provides the UE 262 with its IP address as previously delivered in the GTP-C Create Session Response. Thereafter, the TWAG 260 routes packets between UE 262 and PGW 222 via SGW 238.

Figure 6A:
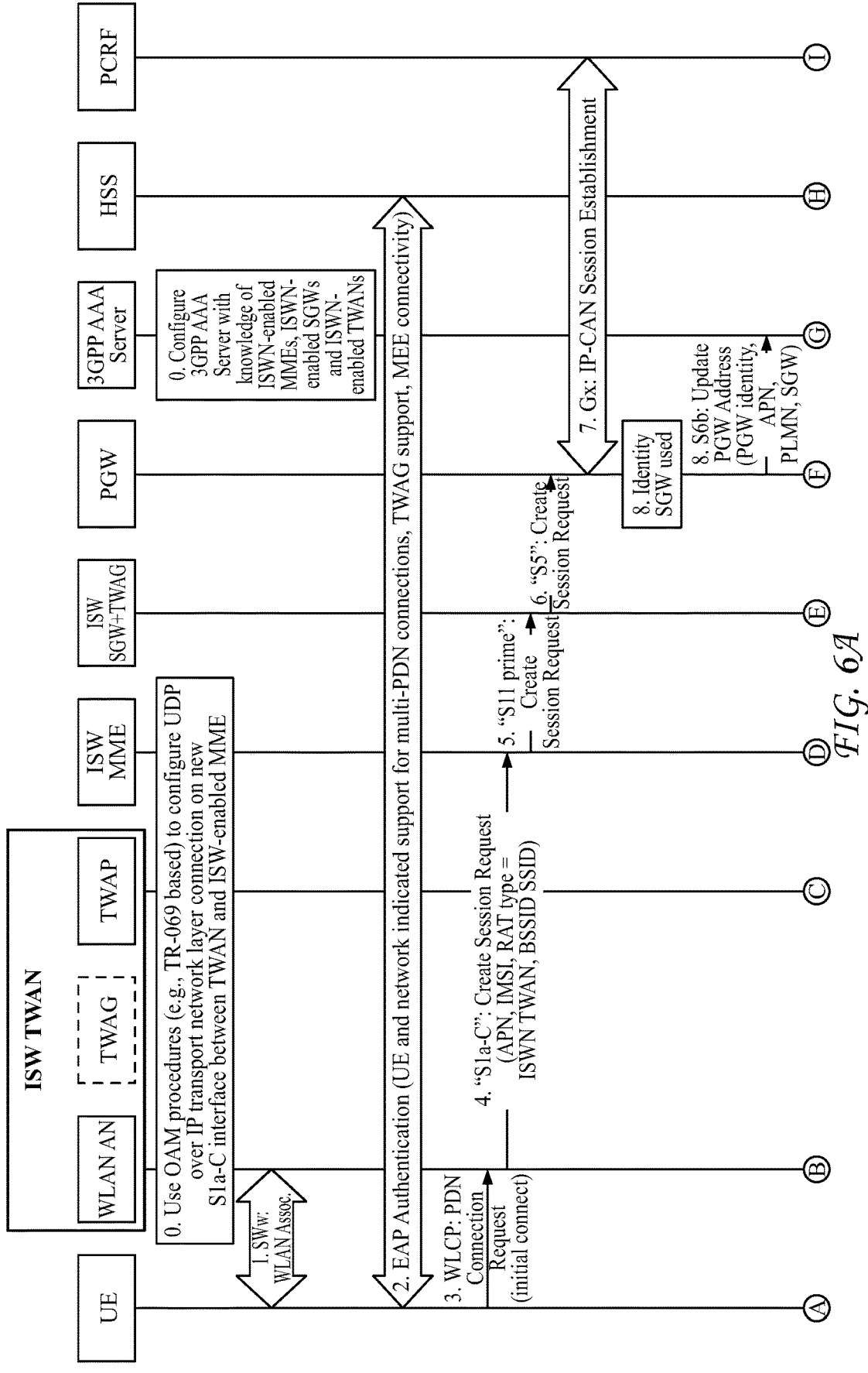

Initial TWAN Attach with Multi-PDN Connection Capability Via Extended MME and Combined SGW+TWAG In the processing depicted in FIGS. 4 and 5, the TWAN was understood to provide "single-PDN" connectivity. According to another aspect of the disclosed embodiments, the systems for integrated system processing also accommodate TWANs that provide "multi-PDN" connections. FIGS. 6A-B depict example processing related to a UE attaching to a PDN via a TWAN that supports multi-PDN connectivity. In the example processing of FIGS. 6A-B, it is presumed that the TWAG functionality has been located in the SGW as depicted in FIG. 3.

In connection with FIGS. 6A-B, the processing involves an initial attach, and subsequently initiating a PDN connection using the extended WLCP signaling between the UE 362 and the TWAN 312. An ISW-enabled MME 334 and ISW-enabled SGW+TWAG 338 provide attachment to PDN gateway (PGW) 322 via TWAN 312. During processing, the 3GPP AAA Server 318 provides the TWAN 312 with an indication that an ISW-enabled MME 334 may be used if available.

Referring to FIG. 6A, at step 0, as a preliminary matter, the transport network layer (TNL) connection is or previously has been established between TWAN 312 and MME 334 which may be performed using, for example, OAM. The 3GPP AAA Server 318 is configured with maintains information about the ISW-enabled MMEs 334, ISW-enabled SGWs 338, and ISW-enabled TWANs 312.

Referring to FIG. 6A, at step 1, the UE 362 associates to a WiFi access point (AP) that is part of an operator's Trusted WLAN Access Network (TWAN) 312. The association occurs via standard IEEE 802.11 procedures via the SWw interface 356. The UE 362 may discover and attempt association with this WiFi AP based on pre-configured information, ANDSF policies, ANQP signaling, etc. In the scenario where the UE 362 has an existing PDN connection via LTE access, the requested results in multiple access PDN connectivity "MAPCON," i.e., simultaneous use of cellular and WiFi access for PDN connectivity.

At step 2, the EAP authentication is performed. The processing is substantially the same as described above in connection with steps 2-8 of FIG. 4A with the exception that in the scenario associated with FIG. 6A, the EAP Payload may contain an indication of the UE's "multi-PDN" TWAN capability as per the SaMOG phase-2 solution described in 3GPP TR 23.852 v 12.0.0.

At step 3, and after the UE 362 has attached to the TWAN 312, the UE 362 requests a PDN Connection from the WLAN AN 310 via the SaMOG phase-2 "WLAN Control Protocol" (WLCP). In the example processing depicted in FIG. 6A, the UE 362 requests connection to a PDN to which the UE 362 is not currently connected.

At step 4, the WLAN AN 310 generates and transmits a GTP-C Create Session Request message to the selected MME 334 over S1a-C interface 390.

At step 5, the MME 334 transmits a GTP-C Create Session Request message to the SGW over the S11' ("prime") interface 374. The message may comprise any suitable information that is need for further processing. In an example embodiment, the message may comprise, for example, an APN, IMSI, RAT type (e.g., ISW-WLAN), BSSID, SSID, etc.

At step 6, the SGW 338 transmits the GTP-C Create Session Request message to the selected PGW 322 over the S5 interface 340.

At step 7, if dynamic policy and charging control (PCC) is implemented, the PGW 322 communicates the session establishment to the Policy and Charging Rules Function (PCRF) 394 in order to retrieve the QoS and charging rules. The PGW 322 enforces these rules as needed. If dynamic PCC is not implemented, such rules may be pre-configured in the PGW 322.

At step 8 depicted on FIGS. 6A-B, the PGW 322 uses the S6b interface 396 to update the 3GPP AAA Server 318 with the associated PGW connectivity information for the UE 362. In addition, it provides the associated SGW information. The 3GPP AAA Server 318 subsequently updates the Home Subscriber System (HSS) 370 with this information via the SWx interface 380.

At step 9 of FIG. 6B, the PGW 322 generates and transmits a GTP-C Create Session Response message to the SGW 338 over the S5 interface 340. The response message comprises any suitable information that is needed for further processing, including, for example, GTP tunnel information, bearer parameters, and the allocated UE IP address. The GTP tunnel between the PGW 322 and SGW 338 is thereby established.

At step 10, the SGW 338 transmits the GTP-C Create Session Response message to the MME 334 over the modified S11' ("prime") interface 374.

At step 11, the MME 334 transmits the GTP-C Create Session Response message to the WLAN AN 310 over the S1a-C interface 390. The message comprises any suitable information including, for example, GTP tunnel information, bearer parameters, and the allocated UE IP address.

At step 12, the WLAN AN 310 communicates the successful PDN Connection establishment to the UE 362 via the WLCP protocol over the SWw interface 356.

At step 13, if the UE 362 did not receive its IPv4 address in the previous step, it may receive the IPv4 address from the WLAN AN 310 via DHCPv4. The TWAG 338 can now route packets between the UE 362 and PGW 322 via the combine SGW+TWAG 338.

Figure 7A:
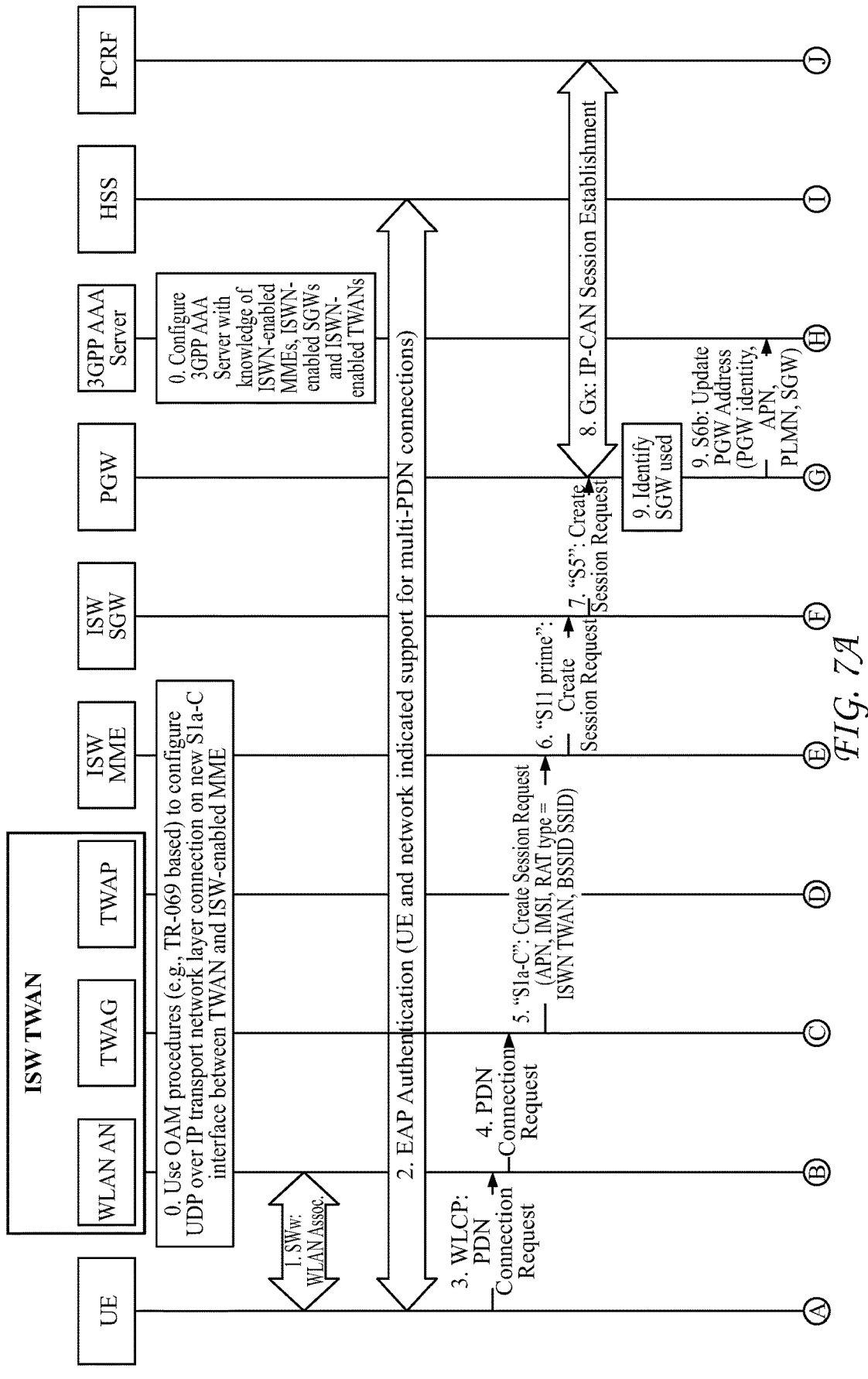

Initial TWAN Attach with Multi-PDN Connection Capability Via Extended MME and Standalone SGW In the example embodiment of FIG. 2, the TWAG 260 is located in the TWAN 212 rather than in the SGW as in FIG. 3. FIGS. 7A-B depict a flow diagram depicting example processing associated with a UE attaching to a PDN via a TWAN in a system such as depicted in FIG. 2 wherein the TWAN has multi-PDN connectivity. More particularly, FIGS. 7A-B depict processing in an example system embodiment wherein the TWAN 212 supports a multi-PDN connection and wherein the TWAG functionality is located in the TWAN 212.

It will be appreciated that this scenario consists of two separate procedures: one for the initial attach using EAP extensions, and one for subsequent PDN connection(s) using the extended WLCP signaling between the UE and TWAN. In this particular example, it is understood that the TWAN consists of a WLAN AN, TWAP and TWAG.

Referring to FIG. 7A, at step 0, as a preliminary matter, the transport network layer (TNL) connection is or previously has been established between TWAN 212 and MME 234. The 3GPP AAA Server 218 is configured with and maintains information about the ISW-enabled MMEs 234, ISW-enabled SGWs 238, and ISW-enabled TWANs 212.

Referring to FIG. 7A, at step 1, the UE 262 associates with a WiFi access point (AP) that is part of an operator's Trusted WLAN Access Network (TWAN) 212. The association occurs via standard IEEE 802.11 procedures via the SWw interface 256. The UE 262 may discover and attempt association with this WiFi AP based on pre-configured information, ANDSF policies, ANQP signaling, etc. In the scenario where the UE 262 has an existing PDN connection via LTE access, the requested results in multiple access PDN connectivity "MAPCON," i.e., simultaneous use of cellular and WiFi access for PDN connectivity.

At step 2, the EAP authentication is performed. The processing is substantially the same as described above in connection with steps 2-8 of FIG. 5A with the exception that in the scenario associated with FIG. 7A, the EAP Payload may contain an indication of the UE's "multi-PDN" TWAN capability as per the SaMOG phase-2 solution described in 3GPP TR 23.852 v 12.0.0.

At step 3, the UE 262 requests a PDN Connection via the SaMOG phase-2 "WLAN Control Protocol" (WLCP). For this example scenario, it is understood that the UE 262 requests connection to a PDN to which it is not currently connected.

At step 4, the WLAN AN 210 function in the TWAN 212 forwards the PDN Connection Request to the TWAG 260.

At step 5, the TWAG 260 sends a GTP-C Create Session Request message to the selected MME 234 over the S1a-C interface 290.

At step 6, the MME 260 transmits a GTP-C Create Session Request message to the SGW 238 over the S11' ("prime") interface 274. The message comprises any suitable information needed for further processing including, for example, an APN, IMSI, RAT type (e.g., ISW-WLAN), BSSID, SSID, etc.

At step 7, the SGW 238 transmits a GTP-C Create Session Request message to the selected PGW 222 over the S5 interface 240.

At step 8, if dynamic policy and charging control (PCC) is implemented, the PGW 222 communicates the session establishment to the Policy and Charging Rules Function (PCRF) 294 in order to retrieve the QoS and charging rules. The PGW 222 enforces these rules as needed. If dynamic PCC is not implemented, such rules may be pre-configured in the PGW 222.

At step 9 of FIG. 7A, the PGW 222 uses the S6b interface 396 to update the 3GPP AAA Server 218 with the associated PGW connectivity information for the UE 262. In addition, it also provides the associated SGW information. The 3GPP AAA Server 218 subsequently updates the Home Subscriber System (HSS) 270 with this information via the SWx interface 280.

At step 10 shown on FIG. 7B, the PGW 222 generates and transmits the GTP-C Create Session Response message to the SGW over the S5 interface including GTP tunnel information, bearer parameters, and the allocated UE IP address. The GTP tunnel between the PGW 222 and SGW 238 is thereby established.

At step 11, the SGW 238 transmits the GTP-C Create Session Response message to the MME 234 over the S11' ("prime") interface 274.

At step 12, the MME 234 transmits the GTP-C Create Session Response message to the TWAG 260 over the S1a-C interface 290. The message includes GTP tunnel information, bearer parameters, and the allocated UE IP address.

At step 13, the TWAG 260 generates and transmits an internal message to the WLAN AN 210 informing it that the S1a-U 292 bearer has been successfully established.

At step 14, the WLAN AN 210 communicates the successful PDN Connection establishment to the UE 262 via the WLCP protocol over the SWw interface 256.

At step 15, if the UE 262 did not receive its IPv4 address in the previous step, it may receive the IPv4 address from the TWAG 260 via DHCPv4. The TWAG 260 can now route packets between the UE 262 and PGW 222 via the SGW 238.

Intra-MME/Intra-SGW Handover from LTE to TWAN

The processing described above in connection with FIGS. 4-7 relates to various scenarios whereby a UE attaches to a PDN via a TWAN. In the instance where a UE has attached to a PDN, it may be useful to hand over a connection to the PDN to another of the wireless access networks, i.e. WiFi and cellular LTE. For example, where a UE has an established connection to a PDN via cellular LTE, the UE may wish to hand over the communication to the PDN to a WLAN connection that the UE has with the PDN. Alternatively, where a UE is connected to a PDN through both a WLAN and cellular connection, the UE may wish to hand over the communication received on the WLAN to the cellular connection.

Figure 8A:
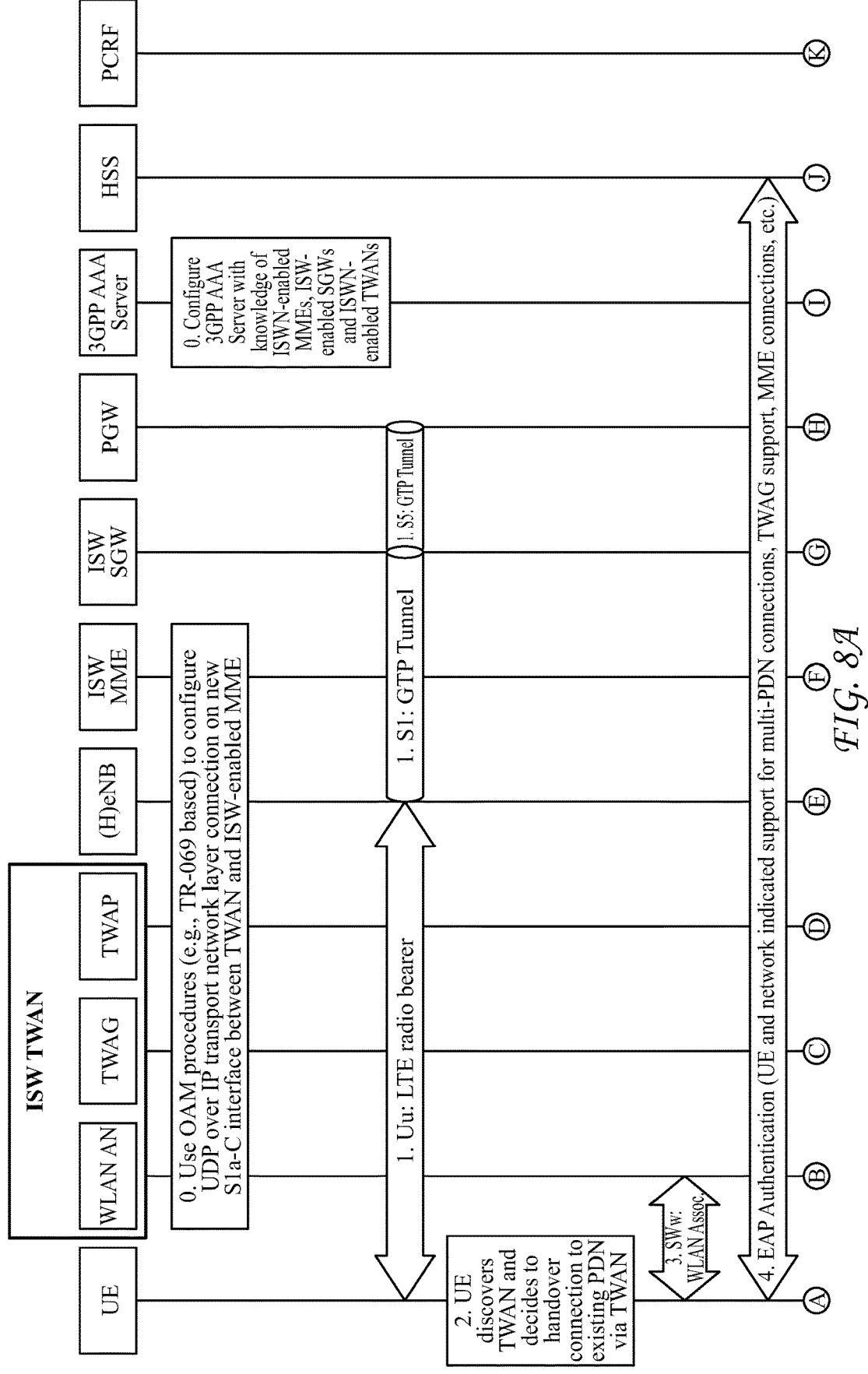
FIGS. 8A-C provide a diagram depicting example processing associated with a handover of a connection from an LTE access network to TWAN.
Figure 8B:
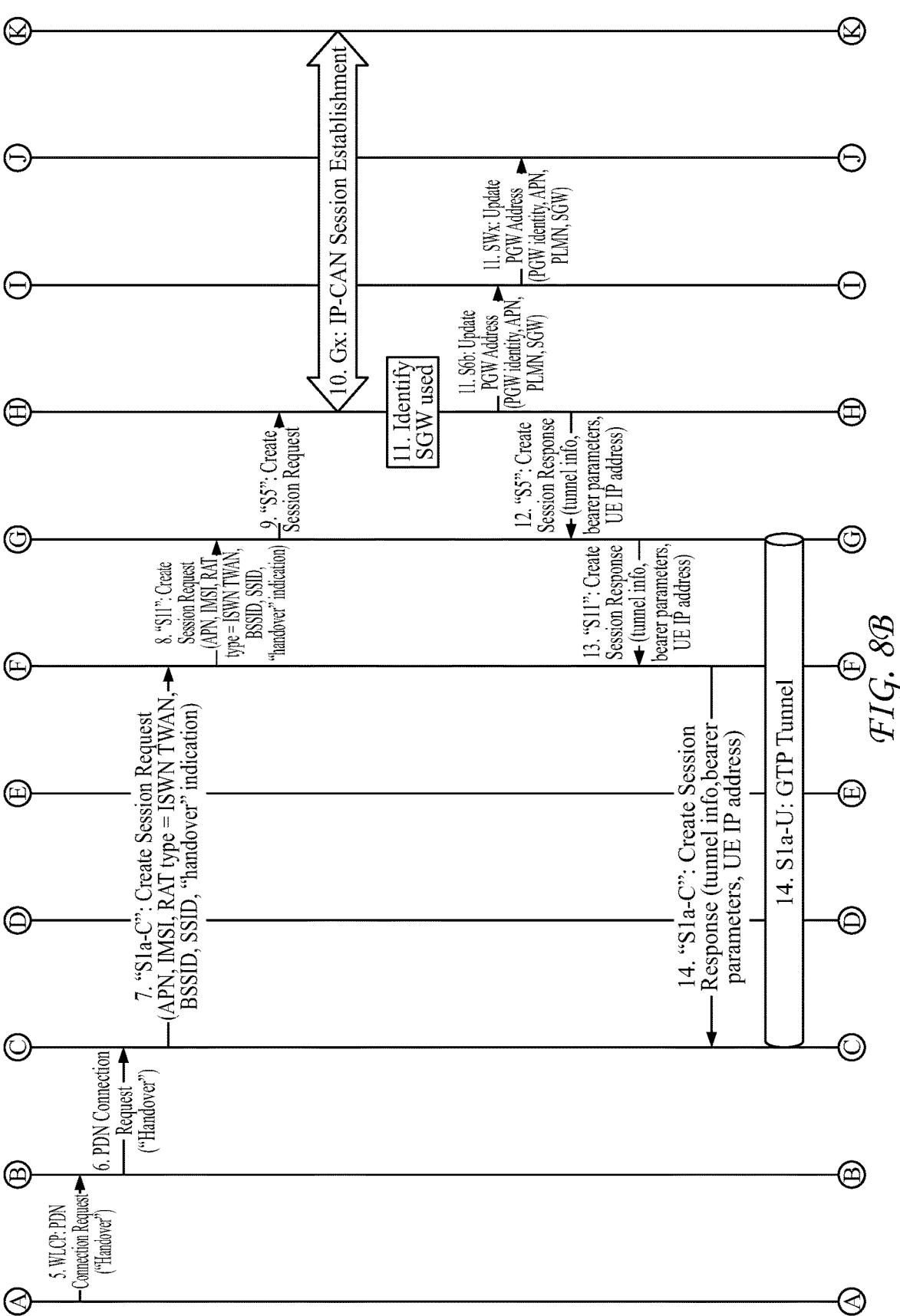
Figure 8C:
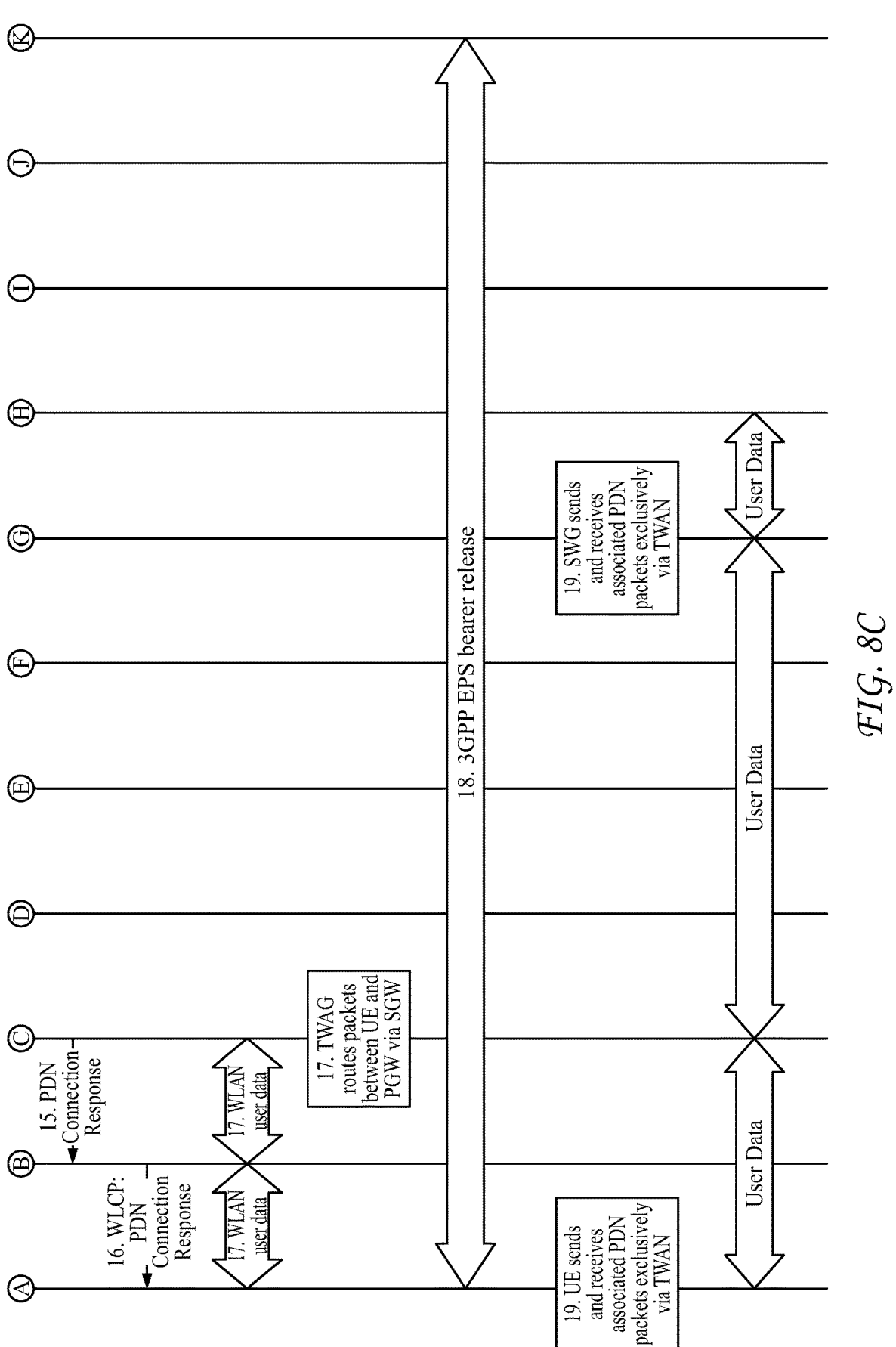

FIGS. 8A-C depict example processing associated with handing over a communication path from an existing LTE connection to a WLAN connection. The UE attaches via TWAN to establish a connection to a PDN to which it was already connected via LTE.

In the example scenario of FIGS. 8A-C, the source (H)eNB LTE access network and target TWAN are both controlled by the same ISW-enabled MME 234 and served by the same standalone ISW-enabled SGW 238. Once the TWAN connection is established, the UE 264 releases the associated LTE connection thereby completing a handover from LTE to TWAN.

In the example processing depicted in FIGS. 8A-C, the TWAN is understood to have a multi-PDN connection. It will be appreciated that similar processing may be performed in connection with a TWAN that provides single-PDN connectivity.

Referring to FIG. 8A, at step 0, as a preliminary matter, the transport network layer (TNL) connection is or previously has been established between TWAN 212 and MME 234 which may be performed using, for example, OAM. The 3GPP AAA Server 218 is configured with and maintains information about the ISW-enabled MMEs 234, ISW-enabled SGWs 238, and ISW-enabled TWANs 212.

At step 1, the UE 262 uses its established connection via an (H)eNB LTE access network 295 to a PDN through the PGW 222 via an ISW-enabled SGW 238. In an example scenario, the connection may consist of a concatenation of the following: an LTE radio bearer over the Uu interface 297 between the UE 262 and (H)eNB 295; a GTP tunnel over the S1 interface 298 between the (H)eNB 295 and SGW 238; and a GTP tunnel over the S5 interface 240 between the SGW 238 and PGW 222.

At step 2, the UE 262 discovers a WiFi AP belonging to the operator's TWAN 212 and determines to hand over an existing PDN connection from the (H)eNB 295 to the TWAN 212. The UE 262 may discover and attempt association with this WiFi AP based on pre-configured information, ANDSF policies, ANQP signaling, etc.

At step 3, the UE 262 associates to the WiFi access point (AP). Association occurs via standard IEEE 802.11 procedures via the SWw interface.

At step 4 of FIG. 8A, EAP authentication is performed similar to steps 2-8 described above in connection with FIG. 5 with the exception that in the processing of FIG. 8, the EAP Payload may contain an indication of the UE's "multi-PDN" support per the SaMOG phase-2 solution described in 3GPP TR 23.852 v 12.0.0.

At step 5 shown on FIG. 8B, the UE 262 requests a PDN Connection via the SaMOG phase-2 WLAN Control Protocol (WLCP). The request comprises any information needed for further processing including, for example, the APN for the current PDN connection existing over LTE.

At step 6, the WLAN AN 210 function in the TWAN 212 forwards the PDN Connection Request to the TWAG 260.

At step 7, the TWAG 260 generates and transmits a GTP-C Create Session Request message to the ISW-enabled MME 234 over the S1a-C interface 290. The message comprises any information that is need for further processing including, for example, an APN, IMSI, RAT type (e.g., ISW-WLAN), BSSID, SSID, etc.), along with the "handover" indication.

At step 8, the MME 234 transmits a GTP-C Create Session Request message to the SGW over the modified S11' ("prime") interface. The message comprises any suitable information needed for further processing including, for example, an APN, IMSI, RAT type (e.g., ISW-WLAN), BSSID, SSID, etc.), along with the "handover" indication.

At step 9, the SGW 238 transmits a Create Session Request with "Handover" Indication for the existing APN to the PGW 222. The example processing of FIG. 8 involves intra-SGW handover over an existing PDN connection. Accordingly, the same PGW 222 is used for both the LTE and WLAN connections. Therefore, when the PGW 222 sees the Create Session Request message with the "Handover" indication, the PGW 222 uses the existing GTP tunnel rather than create a new one with the SGW 238. The main effect of this message is to allow the PGW 222 to notify the PCRF 294 of the change in access such that the appropriate policy and charging takes place.

At step 10, if dynamic policy and charging control (PCC) is implemented, the PGW 222 communicates the session establishment to the Policy and Charging Rules Function (PCRF) 294 in order to retrieve the QoS and charging rules. Since the "Handover" Indication is included, the PGW 222 executes a PCEF-initiated IP-CAN Session Modification Procedure with the PCRF 294 to obtain the policy and charging rules to be enforced. The PGW 222 enforces these rules as needed. If dynamic PCC is not implemented, such rules may be pre-configured in the PGW 222.

At step 11, the PGW 222 uses the S6b interface 296 to update the 3GPP AAA Server 218 with the associated PGW 222 connectivity information for the UE 262. In addition, the PGW 222 provides the associated SGW information. The 3GPP AAA Server 218 subsequently updates the Home Subscriber System (HSS) 270 with this information via the SWx interface 280.

At step 12, the PGW 222 generates and transmits a GTP-C Create Session Response message to the SGW 238 over the S5 interface 240 including GTP tunnel information, bearer parameters, and the allocated UE IP address. The message further comprises the previously allocated IP address for the UE. The GTP tunnel between the PGW 222 and SGW 238 is thereby established.

At step 13, the SGW 238 transmits the GTP-C Create Session Response message to the MME 234 over the S11' interface 274. The message comprises any suitable information needed for further processing including, for example, GTP tunnel information, bearer parameters, and the previously allocated IP address for the UE.

At step 14 of FIG. 8B, the MME 234 transmits the GTP-C Create Session Response message to the TWAG 260 over the S1a-C interface 290. The message comprises any suitable information needed for further processing including, for example, GTP tunnel information, bearer parameters, and the previously allocated IP address for the UE.

At step 15 shown on FIG. 8C, the TWAG 260 function in the TWAN 212 transmits the PDN Connection Response to the WLAN AN 210.

At step 16, the WLAN AN 210 communicates the successful PDN Connection establishment to the UE 262 via the WLCP protocol over the SWw interface 256.

At step 17, the TWAG 260 is able to route packets between the UE 262 and PGW 222 via the SGW 238.

At step 18, the UE 262 initiates release of the 3GPP EPS bearer. In other words, the UE 262 drops use of the LTE connection.

At step 19, the UE 262 and SGW 238 transmit and receive associated PDN packets exclusively via the TWAG 260.

Intra-MME/Intra-SGW Multi-Connection Attach Via TWAN

Figure 9A:
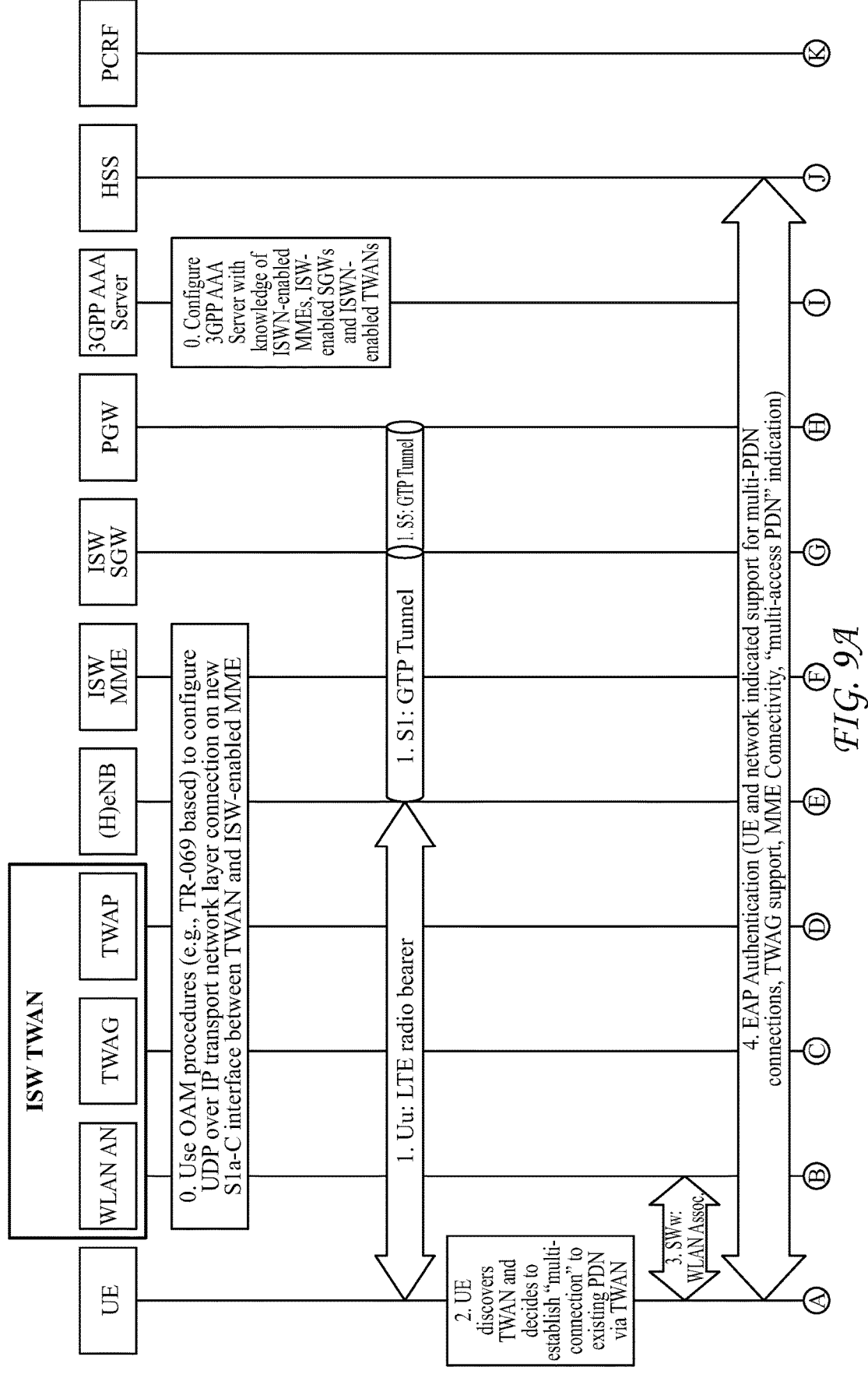
FIGS. 9A-C provide a diagram depicting example processing associated with establishing multi-connection communication with a PDN between LTE and TWAN access.
Figure 9B:
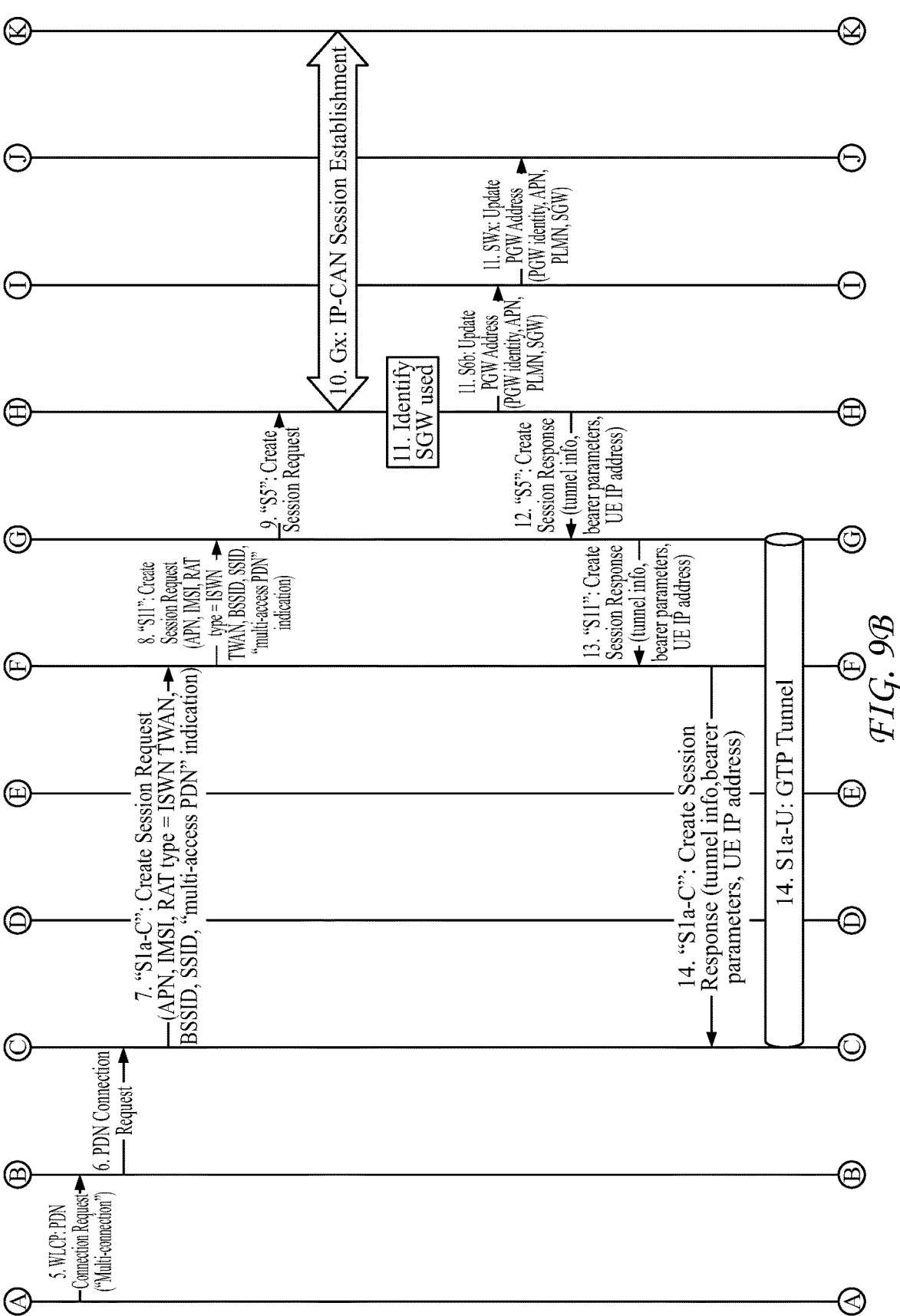
Figure 9C:
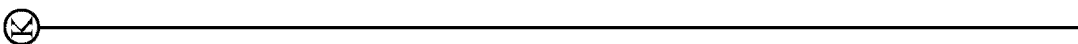
Figure 9C:
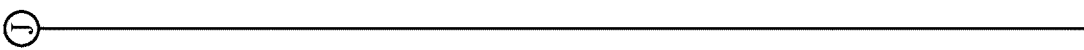
Figure 9C:
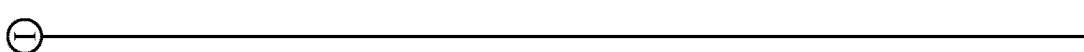

According to another aspect of the disclosed systems and methods, a UE may maintain multiple connections to a PDN. For example, a UE may maintain a first connection to the PDN via WiFi (i.e., TWAN) and a second connection to the same PDN via an LTE access network. Multi-connection attachments may be implemented in embodiments of the disclosed systems incorporating "single-PDN" and "multi-PDN" TWAN connections and wherein the architectures include a local TWAG or a remote SGW+TWAG combination. FIGS. 9A-C depict example processing performed in connection with establishing a multi-connection. It is understood that the processing is performed in an architecture featuring a multi-PDN TWAN connection and a local TWAG. It will be appreciated that the concepts described in connection with FIGS. 9A-C may be applied to other scenarios such as, for example, where the TWAN is a single-PDN TWAN and/or the TWAG is combined in an SGW.

In a multi-connection attachment scenario, an ISW-enabled MME 234 and ISW-enabled SGW 238 are already serving the UE 262 via an LTE connection to a particular PDN. Once the TWAN connection is established to the same PDN, the UE 262 maintains both connections and assigns transmission of specific uplink IP traffic flows to either the TWAN or LTE access depending on locally stored policies, signal conditions, etc. Although the access can change on a packet-by-packet basis, it is expected that a specific access will typically be used for a stable period of time as long as conditions allow. The SGW 238 keeps track of the access for received uplink IP packets and may transmit the associated downlink packets (e.g., based on corresponding 5-tuple) via the same access. Alternatively, the SGW 238 may send downlink packets over either access based on its own criteria, e.g., for load balancing, etc.

Referring to FIG. 9A, at step 0, as a preliminary matter the transport network layer (TNL) connection has been established between TWAN 212 and MME 234 which may be performed using, for example, OAM. The 3GPP AAA Server 218 maintains information about the ISW-enabled MMEs 234, ISW-enabled SGWs 238, and ISW-enabled TWANs 212.

At step 1, the UE 262 uses its established connection via an (H)eNB LTE access network 295 to a PDN through the PGW 222 via an ISW enabled MME 234 and an ISW-enabled SGW 238. In an example scenario, the connection may consist of a concatenation of the following: an LTE radio bearer over the Uu interface 297 between the UE 262 and (H)eNB 295; a GTP tunnel over the S1 interface 298 between the (H)eNB 295 and SGW 238; and a GTP tunnel over the S5 interface 240 between the SGW 238 and PGW 222.

At step 2, the UE 262 discovers a WiFi AP belonging to the operator's TWAN 212 and determines to establish a multi-access connection to the existing PDN. The UE 262 may discover and attempt association with this WiFi AP based on pre-configured information, ANDSF policies, ANQP signaling, etc. The UE 262 may determine to initiate the multi-access PDN connection based on local policies and conditions (e.g., signal strength, perceived congestion, battery power, etc.).

At step 3, the UE 262 associates to a WiFi access point (AP) that is part of the operator's Trusted WLAN Access Network (TWAN) 212. In an example embodiment, association may occur via standard IEEE 802.11 procedures via the SWw interface 256.

At step 4, which is shown on FIG. 9B, EAP authentication is performed similar to steps 2-8 described above in connection with FIG. 5 with the exception that in the processing of FIG. 9, the EAP Payload may contain an indication of the UE's "multi-PDN" support per the SaMOG phase-2 solution described in 3GPP TR 23.852 v 12.0.0.

At step 5, the UE 262 requests a PDN Connection via the SaMOG phase-2 WLAN Control Protocol (WLCP). The request comprises any information that is needed for further processing including, for example, the APN for the same PDN accessed via the existing LTE connection. The request may further comprise a "Multi-connection" indicator which allows the network to assign the same IP address for the UE access to the PDN through the TWAN as is being used for access through the LTE access network 295.

At step 6, the WLAN AN 210 function in the TWAN 212 forwards the PDN Connection Request to the TWAG 260.

At step 7, the TWAG 260 generates and transmits a GTP-C Create Session Request message to the ISW-enabled MME 234 over the S1a-C interface 290. The message comprises any information that is need in further processing including, for example, a multi-connection indication, an APN, IMSI, RAT type (e.g., ISW-WLAN), BSSID, SSID, etc.

At step 8, the MME 234 transmits a GTP-C Create Session Request message to the SGW 238 over the S11' ("prime") interface 274. The message comprises any information that is need in further processing including, for example, a multi-connection indication, an APN, IMSI, RAT type (e.g., ISW-WLAN), BSSID, SSID, etc.

At step 9, the SGW 238 transmits a Create Session Request with "Multi-connection" indication for the existing APN to the PGW 222. The example processing of FIG. 9 involves intra-SGW multi-connection attachment over an existing PDN connection. Accordingly, the same PGW 222 is used for both the LTE and WLAN connections. Therefore, when the PGW 222 identifies the Create Session Request message with the "Multi-connection" indication, the PGW 222 uses the existing SGW GTP tunnel rather than create a new one with the SGW 238. One effect of this message is to allow the PGW 222 to notify the PCRF 294 of the additional TWAN 212 access such that the appropriate policy and charging takes place.

At step 10, if dynamic policy and charging control (PCC) is implemented, the PGW 222 indicates the TWAN session establishment to the Policy and Charging Rules Function (PCRF) 294 in order to retrieve the QoS and charging rules. Since the "Multi-connection" indication is included, the PGW 222 executes a PCEF-initiated IP-CAN Session Modification Procedure with the PCRF 294 to obtain the policy and charging rules to be enforced. The PGW 222 enforces these rules as needed. If dynamic PCC is not implemented, such rules may be pre-configured in the PGW 222.

At step 11, the PGW 222 uses the S6b interface 296 to update the 3GPP AAA Server 218 with the associated PGW connectivity information for the UE 262. In addition, the PGW 222 provides the associated SGW address and multi-connection information. The 3GPP AAA Server 218 subsequently updates the Home Subscriber System (HSS) 270 with this information via the SWx interface 280.

At step 12, the PGW 222 generates and transmits a GTP-C Create Session Response message to the SGW 238 over the S5 interface 240 including GTP tunnel information, bearer parameters, and the allocated UE IP address. This message further comprises the previously allocated IP address for the UE.

At step 13, the SGW 238 transmits the GTP-C Create Session Response message to the MME over the S11' interface 274. The message comprises any suitable information needed for further processing including, for example, GTP tunnel information, bearer parameters, and the previously allocated IP address for the UE.

At step 14, the MME 234 transmits the GTP-C Create Session Response message to the TWAG 260 over the S1a-C interface 290. The message comprises any suitable information including, for example, GTP tunnel information, bearer parameters, and the previously allocated IP address for the UE At step 15, which is shown on FIG. 9C, the TWAG 260 in the TWAN 212 forwards the PDN Connection Response to the WLAN AN 210.

At step 16, the WLAN AN 210 communicates the successful PDN Connection establishment to the UE 262 via the WLCP protocol over the SWw interface 256.

At step 17, the TWAG 260 is able to route packets between the UE 262 and PGW 222 via the SGW 238.

At step 18, the UE 262 may route packets via ISW-SGW 238 to the PDN over either TWAN 212 or the (H)eNB LTE access network 295. Likewise, the SGW 238 may route packets to the UE 262 over either TWAN 212 or the (H)eNB LTE access network 295.

LTE (H)eNB Connections Via ISW-Enabled MME and SGW

The above discussions in connection with FIGS. 4-9 have focused primarily on connections to a PDN that have been initiated via a TWAN. The disclosed systems and methods apply as well, however, to connections initiated via an LTE access network.

Initial Attach Via LTE (H)eNB

In the disclosed systems and methods, an initial attach via an LTE (H)eNB network is performed substantially as defined in existing 3GPP standards. An initial attach via (H)eNB utilizes the standard MME 234 and SGW 238 baseline EPC architecture and protocols. However, in the disclosed systems and methods for integrated small cell and WiFi access, one deviation from existing processing is the ability of the MME 234 to assign an ISW-enabled SGW 238 for initial LTE access. The MME 234 is made aware of this information as part of the extended information provided by the HSS 270 via the S6a interface.

Intra-SGW Handover from TWAN to LTE

Figure 10A:
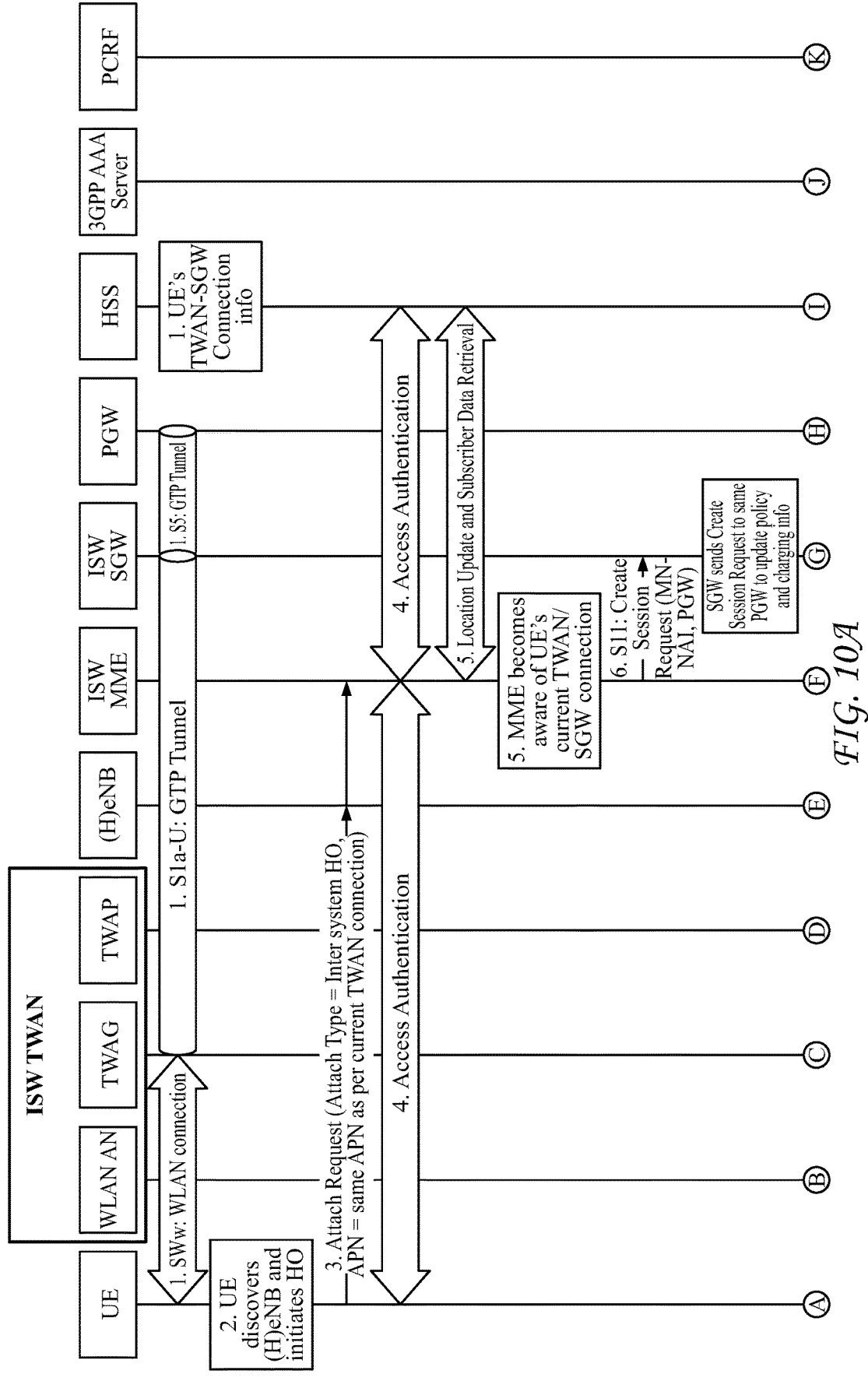
FIGS. 10A-B provide a diagram depicting example processing associated with a handover of a connection from a TWAN to an LTE access network.
Figure 10B:
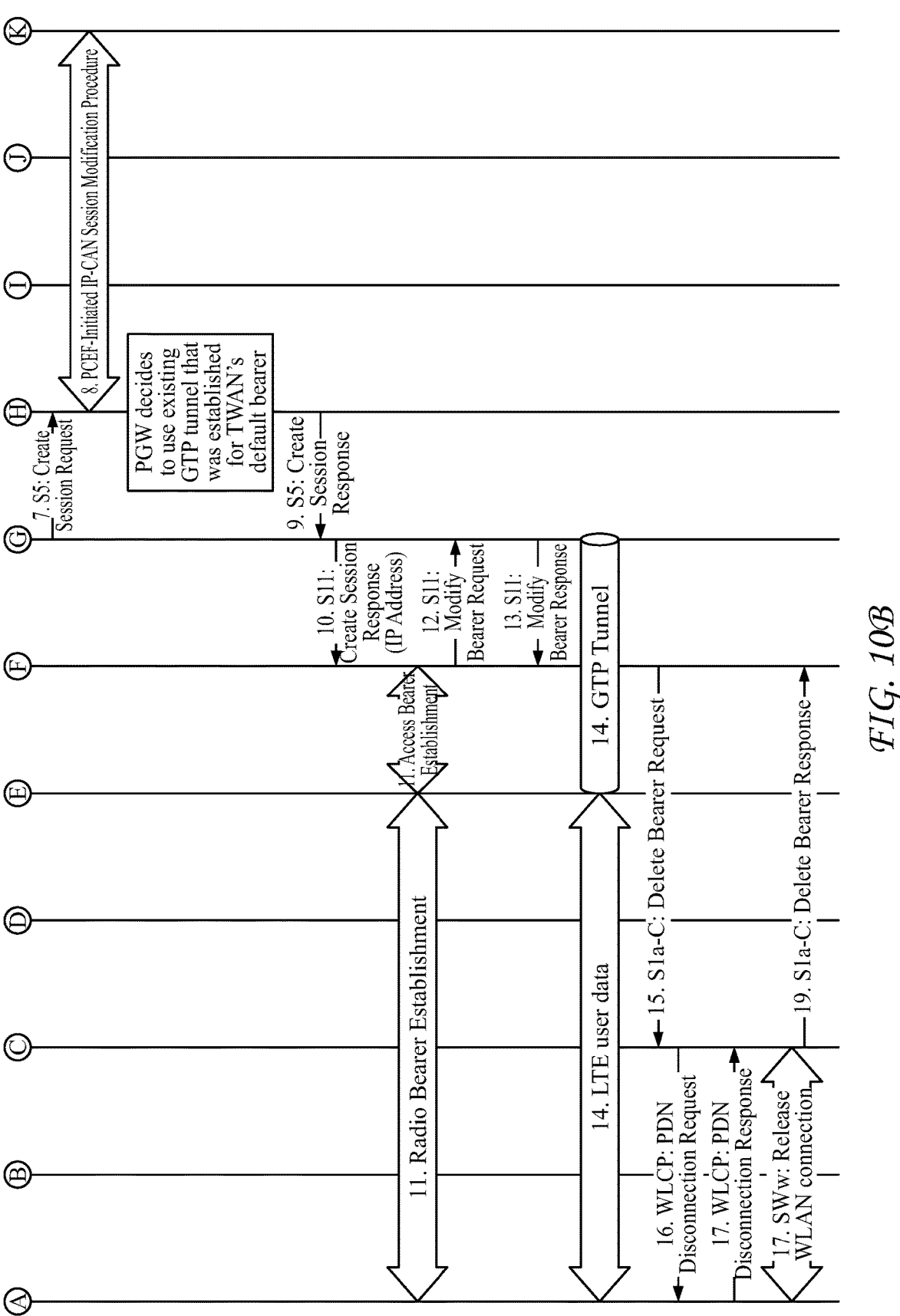

A process for intra-SGW handover from an LTE connection to TWAN connection is described above in connection with FIG. 8. The disclosed systems and methods are likewise adapted to support handovers from a TWAN connection to an LTE connection. FIGS. 10A-B depict example processing performed in connection with a handover procedure from a TWAN connection to an LTE connection.

With respect to intra-system LTE handover, existing 3GPP standards support two forms of intra-system handover: S1-based handover; and X2-based handover. In case different SGWs are serving the source and target eNBs, the required SGW "relocation" procedure is also specified. All intra-LTE handovers are network-initiated, usually based on UE measurements reported to the network.

With respect to inter-system LTE handover, per existing 3GPP standards, all inter-system handovers are initiated by the UE. Handovers are likewise initiated by the UE in connection with the systems and methods for inter system integration disclosed herein. However, pursuant to the presently disclosed systems and methods, and in contrast with the existing methodologies, inter-system LTE/WiFi handovers employ an S1a interface defined between the MME and WLAN.

FIGS. 10A-B depict example processing performed in connection with a handover procedure from a TWAN connection to an LTE connection. Handover processing may be implemented in embodiments of the disclosed systems incorporating "single-PDN" and "multi-PDN" TWAN connections and wherein the architectures include a local TWAG or a remote SGW+TWAG combination. For the purposes of the process depicted in FIGS. 10A-B, it is understood that the processing is performed in an architecture featuring a multi-PDN TWAN connection and a local TWAG. It will be appreciated, however, that the concepts described in connection with FIGS. 10A-B may be applied to other scenarios such as, for example, where the TWAN is a single-PDN TWAN and/or the TWAG is combined in an SGW.

Both intra-SGW and inter-SGW handover are supported by the disclosed system embodiments. However, the processing associated with intra-SGW handover provides the benefit of being handled locally.

In connection with FIGS. 10A-B, an inter-system handover using an intra-MME/intra-SGW procedure is described. It is understood for this particular scenario that a PDN connection already exists via the concatenation of a WLAN link between UE and TWAN, a GTP tunnel between TWAN and SGW, and another GTP tunnel between the SGW and PGW. The scenario could be extended to include the handover of one or more dedicated bearers using the concatenation of additional GTP tunnels.

Referring to FIG. 10A, at step 1, the UE employs a TWAN 212 to connect to the PGW 222 via an ISW-SGW 238 as described above in connection with FIGS. 5A-5B. The connection consists of a concatenation of the following: a WLAN link over the SWw interface 256 between the UE 262 and TWAN 212; a GTP tunnel over the S1a-U interface 292 between the TWAN 212 and SGW 238; and a GTP tunnel over the S5 interface 240 between the SGW 238 and PGW 222.

At step 2, the UE 262 determines to transfer its current sessions (i.e., handover) from the TWAN 212 to the (H)eNB network 295. In an example scenario, the UE 262 may use ANDSF policies to determine the course of action.

At step 3, the UE 262 generates and transmits an Attach Request comprising an Attach Type and APN through the LTE (H)eNB network 295 to the MME 234. The message is routed by the (H)eNB 295 to the MME 234. In the scenario wherein the handover were an inter-system handover, the UE 262 would include the "Handover" indication. For inter-system "Handover", the UE would also include any one of the APNs corresponding to the PDN connections in the TWAN.

At step 4, the MME 234 contacts the HSS 270 and authenticates the UE 262.

At step 5, after successful authentication, the MME 262 performs a location update procedure and subscriber data retrieval from the HSS 270. If the Request Type was "Handover", the PGW address conveyed to the MME 234 is stored in the MME's PDN subscription context. The MME 234 receives information for the UE's TWAN PDN connection via the Subscriber Data obtained from the HSS 270. The HSS 270 may include information identifying the MME 234 and SGW 238 as "ISW-enabled." According to an aspect of the disclosed system embodiments, the HSS 270 may comprise information regarding the SGW 238 that the UE 262 is connected to via the TWAN 212.

At step 6, the MME 234 selects an APN, SGW, and PGW. In case the (H)eNB network 295 can be served by the same SGW as the TWAN (i.e., it is an ISW-enabled SGW), the MME 234 generates and transmits a Create Session Request (including IMSI, MME Context ID, PGW address, APN, and "Handover" indication) message to the selected SGW 238.

At step 7, which is shown on FIG. 10B, the SGW 238 transmits a Create Session Request ("Handover" Indication) message to the PGW 222. In the scenario wherein an intra-SGW handover of an existing PDN connection is being performed, the same PGW 222 is used. When the PGW 222 identifies the Create Session Request message with the inter-system "Handover" indication and the same APN as per the existing session with the TWAN 212, the PGW 222 uses the existing GTP tunnel rather than create a new one with the SGW 238. One effect of this message is to notify the PCRF 294 of the change in access such that the appropriate policy and charging takes place.

At step 8, since the "Handover" indication is included, the PGW 222 executes a PCEF-initiated IP-CAN Session Modification Procedure with the PCRF 294 to obtain the policy and charging rules to be enforced.

At step 9, the PGW 222 responds with a Create Session Response message to the SGW 238. In case of inter-system "Handover," this message includes the IP address or prefix that was assigned to the UE 262 for TWAN access. It also contains the charging ID that was assigned for the PDN connection through the TWAN 212.

At step 10, the SGW 238 returns a Create Session Response message to the MME 234. The message comprises the IP address of the UE 262.

At step 11, the MME 234 initiates access bearer establishment between the (H)eNB LTE access network 295 and SGW 238, and Radio Bearer establishment between the UE 262 and the (H)eNB LTE access network 295.

At step 12, the MME 234 sends a Modify Bearer Request (eNB address, eNB TEID, inter-system "Handover" indication) to the SGW 238 in order to complete the GTP tunnel to the (H)eNB LTE access network 295. The existing GTP tunnel between SGW 238 and PGW 222 is not affected.

At step 13, the SGW acknowledges by sending a Modify Bearer Response (with EPS Bearer Identity) message to the MME 234.

At step 14, the UE 262 sends and receives data via the (H)eNB LTE access network 295.

At step 15, the MME 234 initiates TWAN resource allocation deactivation by sending the Delete Bearer Request to the TWAN 212 over the S1a-C interface 290.

At step 16, the TWAG 260 utilizes the WLCP: PDN Connection Release message to release the UE-TWAN connection.

At step 17, the UE acknowledges the release via the WLCP: PDN Disconnection Response message to the TWAN 212 and releases the WLAN connection.

At step 18, the TWAN 212 indicates release of the TWAN connection by sending the Delete Bearer Response to the MME 234 via the S1a-C interface 290.

Intra-SGW Multi-Connection Attach Via LTE

Figure 11A:
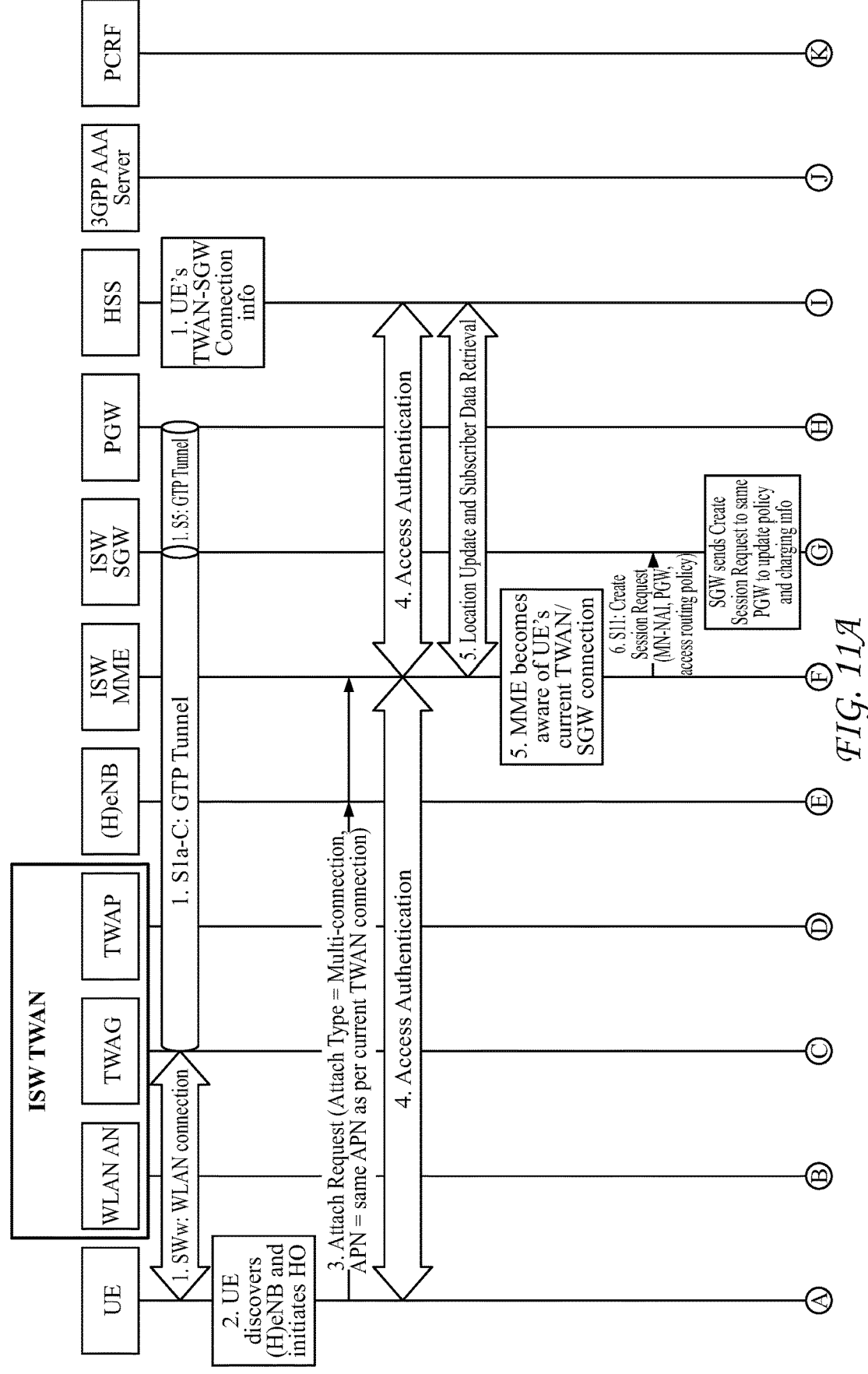
FIGS. 11A-B provide a diagram depicting example processing associated with establishing multi-connection communication with a PDN between TWAN and LTE access.
Figure 11B:
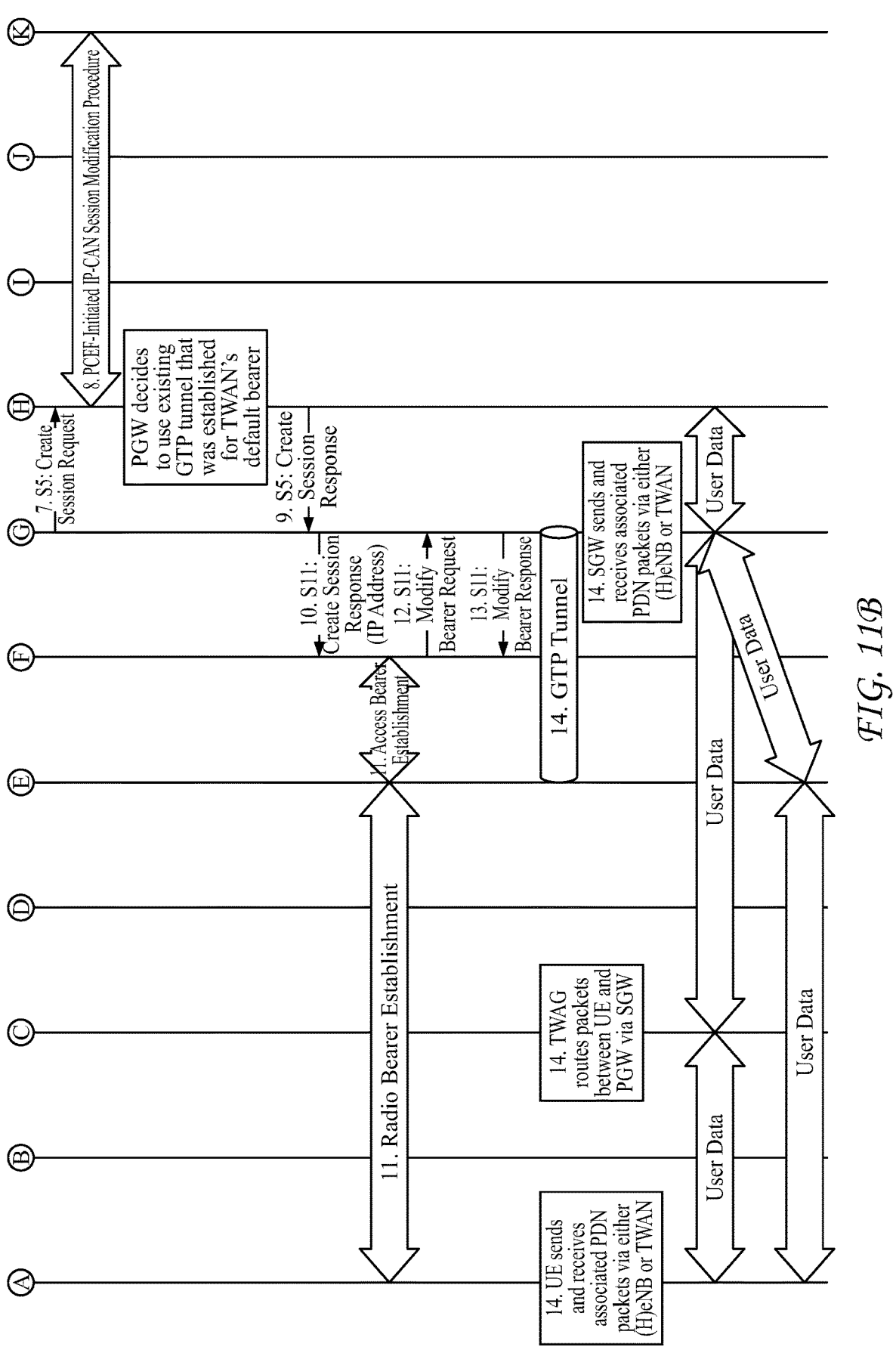

In connection with FIG. 9 above, a process is described for establishing a multi-connection attachment between a UE and PDN wherein a connection via a TWAN is added to an existing LTE connection. The disclosed systems and methods are similarly adapted to support forming multi-channel connections by adding an LTE channel to a previously existing TWAN connection. FIGS. 11A-B depict example processing performed in connection with establishing a multi-channel connection by adding an LTE channel to a previously existing TWAN connection.

In the embodiment depicted in connection with FIGS. 11A-B, based on information provided by the HSS, the MME assigns an ISW-enabled SGW as an intermediate gateway for the LTE PDN connection, possibly with HSS-based policies for handling specific IP data flows over the LTE access. Furthermore, it is understood that the ISW-enabled SGW is already serving the UE via a TWAN connection to the same PDN. Once the LTE connection is established, the UE maintains both connections and assigns transmission of specific uplink IP traffic flows to either the TWAN or LTE access depending on locally stored policies, signal conditions, etc. Although the access can change on a packet-by-packet basis, it is expected that a specific access will typically be used for a stable period of time as long as conditions allow. Based on policy provided by the MME, the SGW keeps track of the access for received uplink IP packets and transmits the associated downlink packets (e.g., based on corresponding 5-tuple) via the same access. Alternatively, the SGW may send downlink packets over either access based on its own criteria, e.g., for load balancing, etc.

Referring to FIG. 11A and step 1, the UE 262 uses a TWAN 212 to connect to the PGW 222 via an ISW-SGW 238. The connection consists of a concatenation of: a WLAN link over the SWw interface 256 between the UE 262 and TWAN 212; and a GTP tunnel over the S1a-U 292 interface between the TWAN 212 and SGW 238; and a GTP tunnel over the S5 interface 240 between the SGW 238 and PGW 222.

At step 2, the UE 262 discovers an (H)eNB LTE access network 295 and determines to establish a multi-access connection to an existing PDN. In an example scenario, the UE 262 may use ANDSF policies to determine the course of action.

At step 3, the UE 262 generates and transmits an Attach Request to the MME 234 including Attach Type and APN. The message is routed by (H)eNB network 295 to MME 234. In the case of multi-access connectivity to an existing PDN, the message includes an indication for "Multi-connection" Attach. For "multi-connection" attach, the UE 262 includes any one of the APNs corresponding to the PDN connections in the TWAN.

At step 4, the MME 234 contacts the HSS 270 and authenticates the UE 262.

At step 5, after successful authentication, the MME 234 performs a location update procedure and subscriber data retrieval from the HSS 270. If the Request Type was "Multi-connection," the PGW address conveyed to the MME 234 is stored in the MME's PDN subscription context. The MME 234 receives information for the UE's TWAN PDN connection via the Subscriber Data obtained from the HSS 270. According to an aspect of the disclosed embodiment, the HSS 270 also includes new information regarding the SGW 238 that the UE 262 is connected to via the TWAN 212.

At step 6, the MME 234 selects an APN, SGW, and PGW. In case the (H)eNB network 295 can be served by the same SGW 238 as the TWAN 212 (i.e., it is an ISW-enabled SGW), the MME 234 transmits a Create Session Request (including IMSI, MME Context ID, PGW address, APN, "Multi-connection" indication, access routing policy) message to the selected SGW 238.

At step 7, which is depicted on FIG. 11B, the SGW 238 transmits a Create Session Request ("Multi-connection" Indication) message to the PGW 222. In the scenario involving an intra-SGW multi-access connection to an existing PDN, the same PGW is used. Therefore, when the PGW 222 identifies the Create Session Request message with the "Multi-connection" indication and the same APN as per the existing session with the TWAN 212, the PGW 222 uses the existing GTP tunnel rather than create a new one with the SGW 238. One effect of this message is to notify the PCRF 294 of the change in access such that the appropriate policy and charging takes place.

At step 8, since the "Multi-connection" indication is included, the PGW 222 executes a PCEF-initiated IP-CAN Session Modification Procedure with the PCRF 294 to obtain the policy and charging rules to be enforced.

At step 9, the PGW 222 responds with a Create Session Response message to the SGW 238. Where the message involves "Multi-connection," the message includes the IP address or prefix that was assigned to the UE for TWAN access. It also contains the charging ID that was assigned for the PDN connection through the TWAN.

At step 10, the SGW 238 returns a Create Session Response message to the MME. The message includes the IP address of the UE 262.

At step 11, the MME 234 initiates access bearers establishment between the (H)eNB network 295 and SGW 238, and Radio Bearer establishment between the UE 262 and the (H)eNB network 295.

At step 12, the MME 234 transmits a Modify Bearer Request (eNB address, eNB TEID, "Multi-connection" indication) to the SGW 238 in order to add the GTP tunnel from the (H)eNB network 295. The existing GTP tunnel between SGW 238 and PGW 222 is not affected.

At step 13, the SGW acknowledges by sending a Modify Bearer Response (with EPS Bearer Identity) message to the MME 234.

At step 14, the UE 262 sends and receives data at this point via the (H)eNB network 295 or TWAN 212. The SGW may route packets to the US 262 over either TWAN 21 or the (H)eNB LTE access network 295.

Example Computing Environment

Figure 12A:
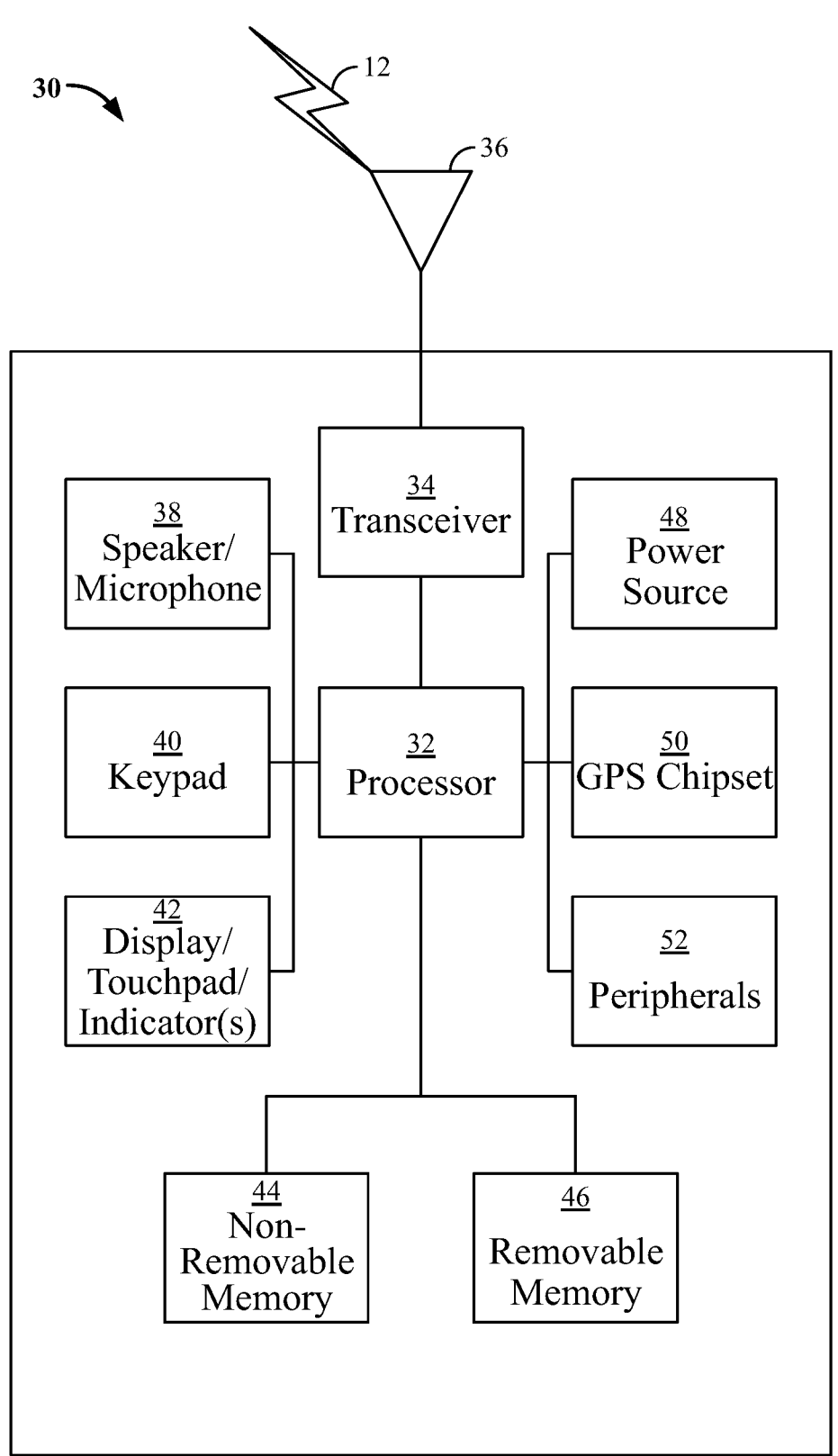
FIG. 12A is a system diagram of an example UE with which one or more disclosed embodiments may be implemented.

FIG. 12A is a system diagram of an example wireless communications device 30, such as, for example, a UE. As shown in FIG. 12A, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. It will be appreciated that the device 30 may include any sub-combination of the foregoing elements while remaining consistent with an embodiment. The device 30 of FIG. 12A may be a device that uses the serving gateway extensions for inter-system mobility systems and methods as discussed above.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 12A depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an eNode-B, Home eNode-B, WiFi access point, etc. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12A as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12B:
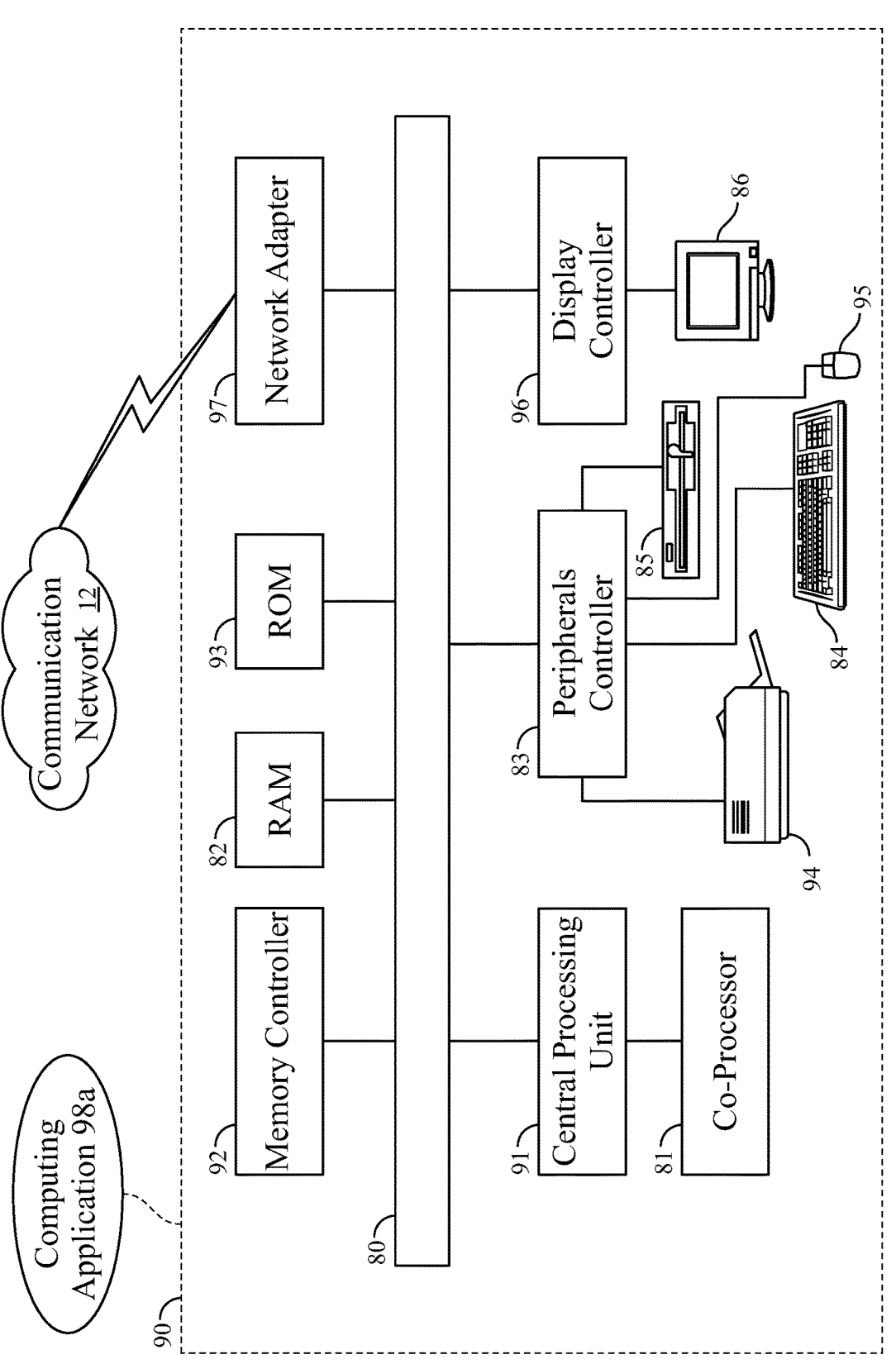
FIG. 12B is a system diagram of an example computing system that may be used to implement the systems and methods described herein.

FIG. 12B depicts a block diagram of an exemplary computing system 90 that may be used to implement the systems and methods described herein. For example, the computing system 1000 may be used to implement devices that operate as, for example, MME, SGW, WLAN, TWAP, and PGW such as referenced herein. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed serving gateway extensions for inter-system mobility systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as PDNs. In an embodiment, network adaptor 97 may receive and transmit data related to the disclosed serving gateway extensions for inter-system mobility systems and methods.

Accordingly, applicants have disclosed example systems and methods for inter-system mobility in integrated LTE and WiFi systems. A control plane interface, referred to as the S1a-C interface, is defined between a trusted WLAN access network (TWAN) and a mobility management entity (MME) comprised in an LTE wireless access network. A user plane interface, referred to as the S1a-U interface, is defined between the TWAN and a server gateway (SGW) in the LTE wireless access network. The MME operates as a common control plane entity for both LTE and TWAN access, while the SGW operates as a user plane gateway for both LTE and TWAN. The integrated MME and SGW allow for user equipment (UE) to access the capabilities of a packet data network (PDN) through either the LTE access network or TWAN. Moreover, an existing communication connection between a UE and a PDN may be handed over from one of the LTE access network or TWAN to the other. Still further, the MME and SGW provide for simultaneously maintain two communication paths, one via the LTE access network and one via the TWAN, between a UE and a packet network.

The disclosed systems and methods may result in various benefits. For example, communication performance is improved by enabling execution of inter-system mobility procedures close to the edge of the network. Communication latency is reduced by minimizing the need for signaling procedures deep in the core network, i.e., toward the PGW. This can be especially beneficial when an MNO deploys both small cell and WiFi access in a common geographic area. Scalability is also improved by reducing the PGW processing burden, e.g., by distributing some inter-system mobility functions to the MME and SGW.

The ability to establish concurrent connections, one via LTE and one via WiFi improves mobility robustness and reduces handover ping-ponging. An alternate path to the PDN can be made available as needed without incurring handover setup delays. This improves the user experience by reducing session interruptions when the primary data path is degraded, which can be a common occurrence given the limited coverage of small cell and WiFi access points.

It will be appreciated that while illustrative embodiments have been disclosed, the scope of potential embodiments is not limited to those explicitly set out. For example, while the system has been described with primary reference to "Trusted" WLAN Access Networks (TWAN), the envisioned embodiments extend as well to embodiments that employ "Untrusted" WLANs. Moreover, it will be appreciated that the disclosed embodiments may encompass single-PDN TWANs as well as multi-PDN TWANs. Still further, the envisioned embodiments include all configurations and placements of TWAG functionality.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/ or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to service level technologies that may appear in the above description.

AAA Authentication, Authorization, and Accounting

ANDSF Access Network Discovery and Selection Function

ANQP Access Network Query Protocol

AP Access Point

APN Access Point Name

CAPWAP Control And Provisioning of Wireless Access Points

DHCP Dynamic Host Configuration Protocol

EAP Extensible Authentication Protocol

EAP-AKA EAP Authentication and Key Agreement

EAP-AKA' EAP AKA "prime"

EAPoL EAP over LAN

EPC Evolved Packet Core

GPRS General Packet Radio Service

GTP GPRS Tunneling Protocol

HSS Home Subscription System

IETF Internet Engineering Task Force

IMSI International Mobile Subscriber Identity

IP Internet Protocol

ISW Integrated Small-cell and WiFi

ISWN Integrated Small-cell and WiFi Networks

LTE Long Term Evolution

MAC Medium Access Control

MAPCON Multi Access PDN Connectivity

MCN Mobile Core Network

MME Mobility Management Entity

MNO Mobile Network Operator

NAS Non Access Stratum

NSWO Non Seamless WLAN Offload

OAM Operations, Administration, and Maintenance

PCRF Policy and Charging Rules Function

PDN Packet Data Network

PGW PDN Gateway

PMIP Proxy Mobile IP

QoE Quality of Experience

QoS Quality of Service

RAT Radio Access Technology

RRC Radio Resource Control

SaMOG S2a Mobility Over GTP

SCTP Stream Control Transport Protocol

SGW Serving Gateway

TEID Tunneling Endpoint Identifier

TWAG Trusted WLAN Access Gateway

TWAN Trusted WLAN Access Network

TWAP Trusted WLAN AAA Proxy

UDP User Datagram Protocol

UE User Equipment

WFA WiFi Alliance

WiFi Wireless Fidelity

WLAN Wireless Local Area Network

WLC Wireless LAN Controller

WLCP Wireless LAN Control Protocol

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

receiving, by a mobility management entity, via a non-cellular communication network, a first request to access a connection to a user plane gateway, wherein the first request indicates maintaining of the connection to the user plane gateway simultaneously over a cellular communication network and the non-cellular communication network for access to a first data service, wherein the connection is configured to allow a User Equipment (UE) to transmit packets associated with the first data service from the UE via the cellular communication network and is also configured to allow the UE to transmit packets associated with the first data service from the UE via the non-cellular communication network;

transmitting, by the mobility management entity, a second request to access the connection for the first data service to the user plane gateway, wherein the second request also indicates the maintaining of the connection to the user plane gateway simultaneously over the cellular communication network and the non-cellular communication network;

receiving, by the mobility management entity, a first message that includes tunnel information corresponding to the connection for the first data service to the user plane gateway; and transmitting, by the mobility management entity, to the non-cellular communication network, a second message that includes the tunnel information corresponding to the connection for the first data service to the user plane gateway.

2. The method of claim 1, wherein the non-cellular communication network is a Wireless Fidelity (WiFi) network.

3. The method of claim 1, wherein the tunnel information relates to an existing communication path.

4. The method of claim 3, wherein the existing communication path is initially established to service access through the cellular communication network.

5. The method of claim 1, wherein at least one of the first message or the second message further includes bearer parameters.

6. The method of claim 1, wherein at least one of the first message or the second message further includes an Internet Protocol (IP) address.

7. The method of claim 1, wherein at least one of the first data service or a second service are associated with an Access Point Name (APN).

8. The method of claim 1, wherein at least one of the first request or the second request includes a Radio Access Technology (RAT) type.

9. The method of claim 1, wherein at least one of the first request or the second request includes at least one of a Basic Service Set Identifier (BSSID) or a Service Set Identifier (SSID).

10. The method of claim 1, wherein the first request and the second request include multi-connection indicators that indicate the maintaining of the connection to the user plane gateway simultaneously over the cellular communication network and the non-cellular communication network.

11. A network entity comprising one or more processors and one or more memories, the network entity configured to perform operations comprising:

receiving, via a non-cellular communication network, a first request to access a connection to a user plane gateway, wherein the first request indicates maintaining of the connection to the user plane gateway simultaneously over a cellular communication network and the non-cellular communication network for access to a first data service, wherein the connection is configured to allow a User Equipment (UE) to transmit packets associated with the first data service from the UE via the cellular communication network and is also configured to allow the UE to transmit packets associated with the first data service from the UE via the non-cellular communication network;

transmitting a second request to access the connection for the first data service to the user plane gateway, wherein the second request also indicates the maintaining of the connection to the user plane gateway simultaneously over the cellular communication network and the non-cellular communication network;

receiving a first message that includes tunnel information corresponding to the connection for the first data service to the user plane gateway; and transmitting, to the non-cellular communication network, a second message that includes the tunnel information corresponding to the connection for the first data service to the user plane gateway.

12. The network entity of claim 11, wherein the non-cellular communication network is a Wireless Fidelity (WiFi) network.

13. The network entity of claim 11, wherein the tunnel information relates to an existing communication path.

14. The network entity of claim 13, wherein the existing communication path is initially established to service access through the cellular communication network.

15. The network entity of claim 11, wherein at least one of the first message or the second message further includes bearer parameters.

16. The network entity of claim 11, wherein at least one of the first message or the second message further includes an Internet Protocol (IP) address.

17. The network entity of claim 11, wherein at least one of the first data service or a second service are associated with an Access Point Name (APN).

18. The network entity of claim 11, wherein at least one of the first request or the second request includes a Radio Access Technology (RAT) type.

19. The network entity of claim 11, wherein at least one of the first request or the second request includes at least one of a Basic Service Set Identifier (BSSID) or a Service Set Identifier (SSID).

20. The network entity of claim 11, wherein the first request and the second request include multi-connection indicators that indicate the maintaining of the connection to the user plane gateway simultaneously over the cellular communication network and the non-cellular communication network.

\* \* \* \* \*